United States Patent
Huh et al.

(10) Patent No.: US 10,459,281 B2
(45) Date of Patent: Oct. 29, 2019

(54) STEREOSCOPIC IMAGE DISPLAY DEVICE

(71) Applicant: Samsung Display Co., Ltd., Yongin-si, Gyeonggi-do (KR)

(72) Inventors: Su Jung Huh, Yongin-si (KR); Yeon-Mun Jeon, Hwaseong-si (KR); Beom Shik Kim, Yongin-si (KR); Jae Joong Kwon, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/645,833

(22) Filed: Jul. 10, 2017

(65) Prior Publication Data

US 2018/0095340 A1 Apr. 5, 2018

(30) Foreign Application Priority Data

Sep. 30, 2016 (KR) .................. 10-2016-0126235

(51) Int. Cl.
*G02F 1/1335* (2006.01)
*G02B 27/22* (2018.01)
(Continued)

(52) U.S. Cl.
CPC ..... *G02F 1/133526* (2013.01); *G02B 27/225* (2013.01); *G02F 1/29* (2013.01); *H04N 13/305* (2018.05); *G02F 2001/294* (2013.01)

(58) Field of Classification Search
CPC ................ G02F 1/29; G02F 1/133526; G02F 2001/294; G02B 27/225; G02B 27/2214;
(Continued)

(56) References Cited

U.S. PATENT DOCUMENTS 8,692,971 B2 4/2014 Chiu
2001/0028028 A1* 10/2001 Iwasaki .............. G02B 27/0068
250/216
(Continued)

FOREIGN PATENT DOCUMENTS

CN 102096266 A * 6/2011
CN 102323702 A * 1/2012
(Continued)

OTHER PUBLICATIONS

English translation of CN 102096266 A, Title: Liquid crystal optical lens and manufacturing method thereof, and lens device using liquid crystal optical lens, Author: Jilong Zhang; Date of publication: Dec. 11, 2009.*

(Continued)

*Primary Examiner* — Shan Liu
(74) *Attorney, Agent, or Firm* — Innovation Counsel LLP

(57) ABSTRACT

A stereoscopic image display device according to an exemplary embodiment includes: a display panel including a plurality of pixels; and a lens panel positioned at a surface where the display panel displays an image, wherein the lens panel includes: a photomodulation unit controlling a light path of light emitted from the display panel; and a first electrode unit and a second electrode unit facing each other via the photomodulation unit interposed therebetween, and wherein the first electrode unit includes a plurality of electrodes that are electrically connected to each other and positioned at different layers, and the second electrode unit includes at least one corresponding electrode overlapping at least one among the plurality of electrodes.

19 Claims, 38 Drawing Sheets

(51) Int. Cl.
*G02F 1/29* (2006.01)
*H04N 13/305* (2018.01)

(58) Field of Classification Search
CPC .... G02B 27/26; G02B 3/0031; G02B 3/0056; G02B 3/005; G02B 3/0068; G02B 1/041; H04N 13/305; H04N 13/0404; H04N 13/0454; H04N 13/0456; H04N 13/0406
USPC ...................................... 349/15, 57, 95, 200
See application file for complete search history.

(56) References Cited

U.S. PATENT DOCUMENTS

| | | | | |
|---|---|---|---|---|
| 2006/0273284 | A1* | 12/2006 | Hirose | G02B 3/14 252/299.61 |
| 2008/0252720 | A1* | 10/2008 | Kim | H04N 13/305 348/59 |
| 2011/0069243 | A1* | 3/2011 | Chang | G02F 1/134309 349/33 |
| 2011/0102689 | A1* | 5/2011 | Chiu | G02B 27/2214 349/15 |
| 2013/0135545 | A1 | 5/2013 | Jung | |
| 2013/0214299 | A1* | 8/2013 | Ryu | H01L 27/1225 257/88 |
| 2013/0286342 | A1* | 10/2013 | Momonoi | G02F 1/134309 349/139 |
| 2014/0152923 | A1* | 6/2014 | Liu | G02B 27/2214 349/15 |
| 2015/0301344 | A1 | 10/2015 | Wittek et al. | |
| 2015/0304637 | A1 | 10/2015 | Shin et al. | |
| 2016/0065950 | A1* | 3/2016 | Quan | G09G 3/003 348/51 |
| 2016/0068755 | A1 | 3/2016 | Beltran Garcia et al. | |
| 2016/0357023 | A1* | 12/2016 | Wang | G02F 1/1343 |
| 2018/0046002 | A1* | 2/2018 | Zhao | G02F 1/1343 |
| 2018/0107087 | A1* | 4/2018 | Xie | H04N 13/315 |

FOREIGN PATENT DOCUMENTS

| | | |
|---|---|---|
| JP | 10-239676 | 9/1998 |
| JP | 4687073 B2 | 5/2011 |
| JP | 2014112157 A | 6/2014 |
| WO | 2016-123944 A1 | 11/2016 |

OTHER PUBLICATIONS

English translation of CN 102323702 A, Title: Liquid crystal lens, Author: Junming Huang; Date of publication: Oct. 13, 2011.*
European Search Report corresponding to EP Application No. 17191822.0, dated Jan. 26, 2018, 8 pages.

* cited by examiner

STEREOSCOPIC IMAGE DISPLAY DEVICE

CROSS-REFERENCE TO RELATED APPLICATION

This application claims priority to and the benefit of Korean Patent Application No. 10-2016-0126235 filed in the Korean Intellectual Property Office on Sep. 30, 2016, the entire contents of which are incorporated herein by reference.

BACKGROUND (a) Field

The Embodiment of the present inventive concept relates to a stereoscopic image display device. More particularly, the present inventive concept relates to a stereoscopic image display device including a lens panel.

(b) Description of the Related Art

With the development of display device technology, a stereoscopic image display device, that is, a three-dimensional (3D) image display device, has drawn attention, and various 3D image display devices have been researched.

A 3D image display technology displays a 3D effect for objects using binocular parallax, which is the most important factor for recognizing the 3D effect at a short distance. The 3D image display device may be classified into various methods, and may be largely classified into a stereoscopic 3D image display device and an autostereoscopic 3D image display device. In a case of the stereoscopic 3D image display device, there is a drawback that spectacles must be worn such that further development of the autostereoscopic 3D image display device is required.

The autostereoscopic 3D image display device may be classified into those using a multi-viewpoint method or a super multi-viewpoint method in which the 3D image may be observed without the spectacles in a specific viewing angle region, and an integrated image method, a volume image method, and a hologram method that provides the 3D image to be closer to actual 3D reality. Among them, the multi-viewpoint method may be classified into a spatial division method of spatially dividing an entire resolution to realize a required viewpoint number by using a lens array, and a temporal division method of temporally and quickly displaying several viewpoint images while maintaining the entire resolution. In the integrated image method, a basic image as an image in which 3D image information is photographed with a limited size in slightly different directions is stored and then is shown through a lens array, thereby allowing the 3D image to be recognized by the observer.

The autostereoscopic 3D image display device includes a photomodulation unit to control a path of light, and the lens array is mainly used as the photomodulation unit. A panel capable of forming the lens array is referred to as a lens panel.

The above information disclosed in this Background section is only for enhancement of understanding of the background of the invention and therefore it may contain information that does not form the prior art that is already known in this country to a person of ordinary skill in the art.

SUMMARY

The Embodiment of the present inventive concept improves an aberration of a lens forming the lens panel, thereby improving a characteristic of the stereoscopic image display device of the lens panel.

A stereoscopic image display device according to an exemplary embodiment includes: a display panel including a plurality of pixels; and a lens panel positioned at a surface where the display panel displays an image, wherein the lens panel includes: a photomodulation unit controlling a light path of light emitted from the display panel; and a first electrode unit and a second electrode unit facing each other with the photomodulation unit interposed therebetween, and wherein the first electrode unit includes a plurality of electrodes that are electrically connected to each other and are each positioned at different layers, and the second electrode unit includes at least one corresponding electrode overlapping at least one electrode among the plurality of electrodes.

The first electrode unit may include a first electrode, a second electrode, and a first insulating layer positioned between the first electrode and the second electrode.

The second electrode may have a first opening, and the first electrode may overlap the first opening.

The first electrode may overlap the first opening and the second electrode, the first insulating layer may have a first contact hole at a part where the first electrode and the second electrode overlap, and the first electrode and the second electrode may be electrically connected to each other through the first contact hole.

The first electrode may not overlap the second electrode and is connected to a branch unit overlapping the second electrode, the first insulating layer may have a first contact hole overlapping the branch unit, and the first electrode and the second electrode may be electrically connected to each other through the first contact hole. The first electrode unit may further include a third electrode, and a second insulating layer positioned between the second electrode and the third electrode.

The third electrode may have a second opening, and the first opening may overlap the second opening.

The first electrode may not overlap the second electrode and is connected to a branch unit overlapping the second electrode, the third electrode may overlap the second electrode, the first insulating layer, the second electrode, and the second insulating layer may have a first contact hole overlapping the branch unit at a part where the second electrode and the third electrode overlap each other, and the first electrode, the second electrode, and the third electrode may be electrically connected to each other through the first contact hole.

The third electrode may overlap the first electrode and the second electrode, the first insulating layer, the second electrode, and the second insulating layer may have a first contact hole at a part where the first electrode, the second electrode, and the third electrode overlap each other, and the first electrode, the second electrode, and the third electrode may be electrically connected to each other through the first contact hole.

The second electrode unit may include a first corresponding electrode having a first corresponding opening, and the first opening may overlap the first corresponding opening.

The second electrode unit may further include a second corresponding electrode, and a first corresponding insulating layer positioned between the first corresponding electrode and the second corresponding electrode.

The second corresponding electrode may have a second corresponding opening, and the first corresponding opening may overlap the second corresponding opening.

The first corresponding insulating layer may have a second contact hole at a part where the first corresponding electrode and the second corresponding electrode overlap, and the first corresponding electrode and the second corresponding electrode may be electrically connected to each other through the second contact hole.

The second electrode unit may further include a third corresponding electrode, and a second corresponding insulating layer positioned between the second corresponding electrode and the third corresponding electrode.

The third corresponding electrode may have a third corresponding opening, and the second corresponding opening may overlap the third corresponding opening.

The first corresponding insulating layer, the second corresponding electrode, and the second corresponding insulating layer may have a second contact hole at a part where the first corresponding electrode, the second corresponding electrode, and the third corresponding electrode overlap each other, and the first corresponding electrode, the second corresponding electrode, and the third corresponding electrode may be electrically connected to each other through the second contact hole.

A stereoscopic image display device according to another exemplary embodiment of the present inventive concept includes: a display panel including a plurality of pixels; and a lens panel positioned at a surface where the display panel displays an image, wherein the lens panel includes: a photomodulation unit controlling a light path of light emitted from the display panel; and a first electrode unit and a second electrode unit facing each other with the photomodulation unit interposed therebetween, the first electrode unit includes: a first electrode having a plurality of first openings respectively overlapping at least one pixel; a second electrode having a second opening overlapping a plurality of first openings; and a first insulating layer positioned between the first electrode and the second electrode and insulating the first electrode and the second electrode from each other, and the second electrode unit includes a first corresponding electrode overlapping the second opening and the plurality of first openings.

In a first mode to display a 2D image, different voltages may be applied to the first electrode and the first corresponding electrode.

In a second mode to display a 3D image, different voltages may be applied to the second electrode and the first corresponding electrode.

The first corresponding electrode may entirely overlap one surface of the second electrode unit.

An aberration of the lens formed by the lens panel may thereby be improved. Accordingly, a characteristic of the stereoscopic image display device including the lens panel may be improved.

DETAILED DESCRIPTION

Figure 1:
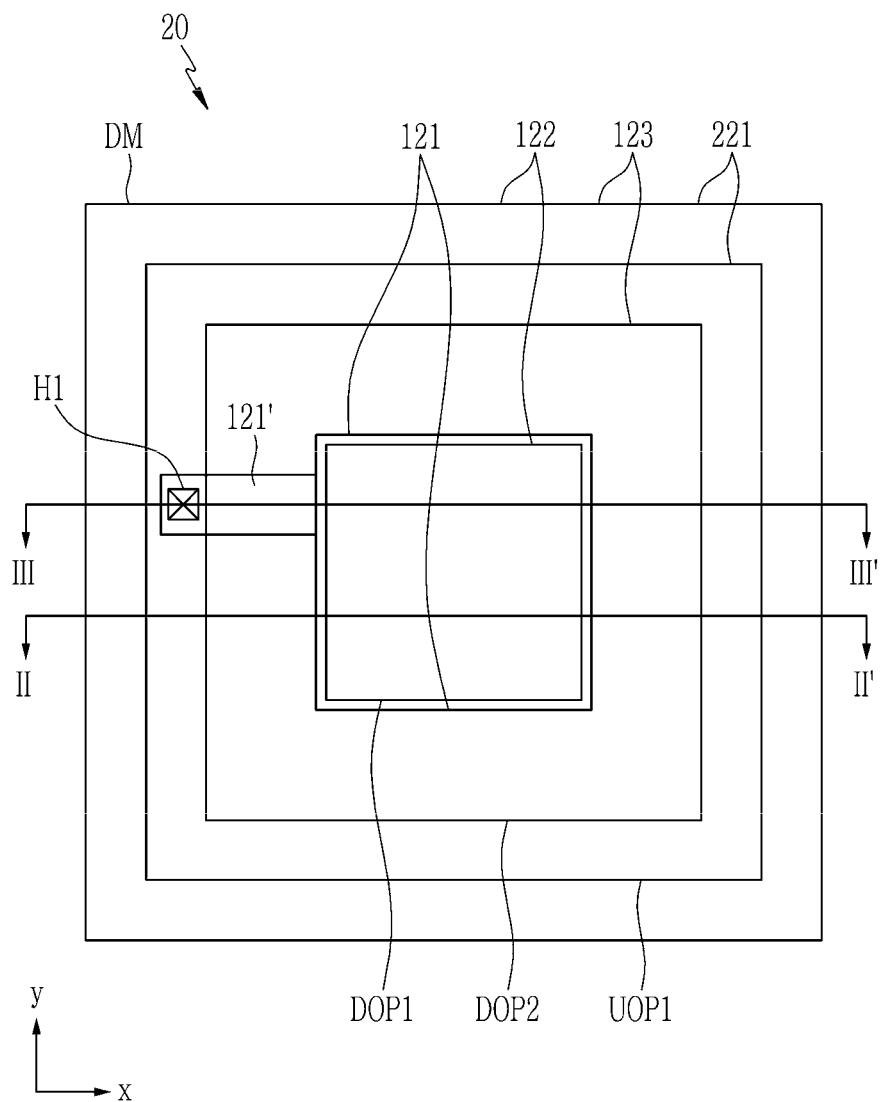
FIG. 1 is a plane view of a lens panel according to an exemplary embodiment.

The Embodiment of the present inventive concept will be described more fully hereinafter with reference to the accompanying drawings, in which exemplary embodiments of the invention are shown. As those skilled in the art would realize, the described embodiments may be modified in various different ways, all without departing from the spirit or scope of the present inventive concept.

In order to clearly explain the present inventive concept, a portion that is not directly related to the present inventive concept was omitted, and the same reference numerals are attached to the same or similar constituent elements through the entire specification.

In addition, the size and thickness of each configuration shown in the drawings are arbitrarily shown for better understanding and ease of description, but the present inventive concept is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "on a plane" means viewing the object portion from the top, and the phrase "on a cross-section" means viewing a cross-section of which the object portion is vertically cut from the side.

Further, in this specification, the phrase "overlapping" means to be vertically overlapped on a cross-section, or positioning all or a part in the same region on a plane.

Now, a lens panel 20 according to an exemplary embodiment will be described with reference to FIG. 1 to FIG. 5.

Figure 2:
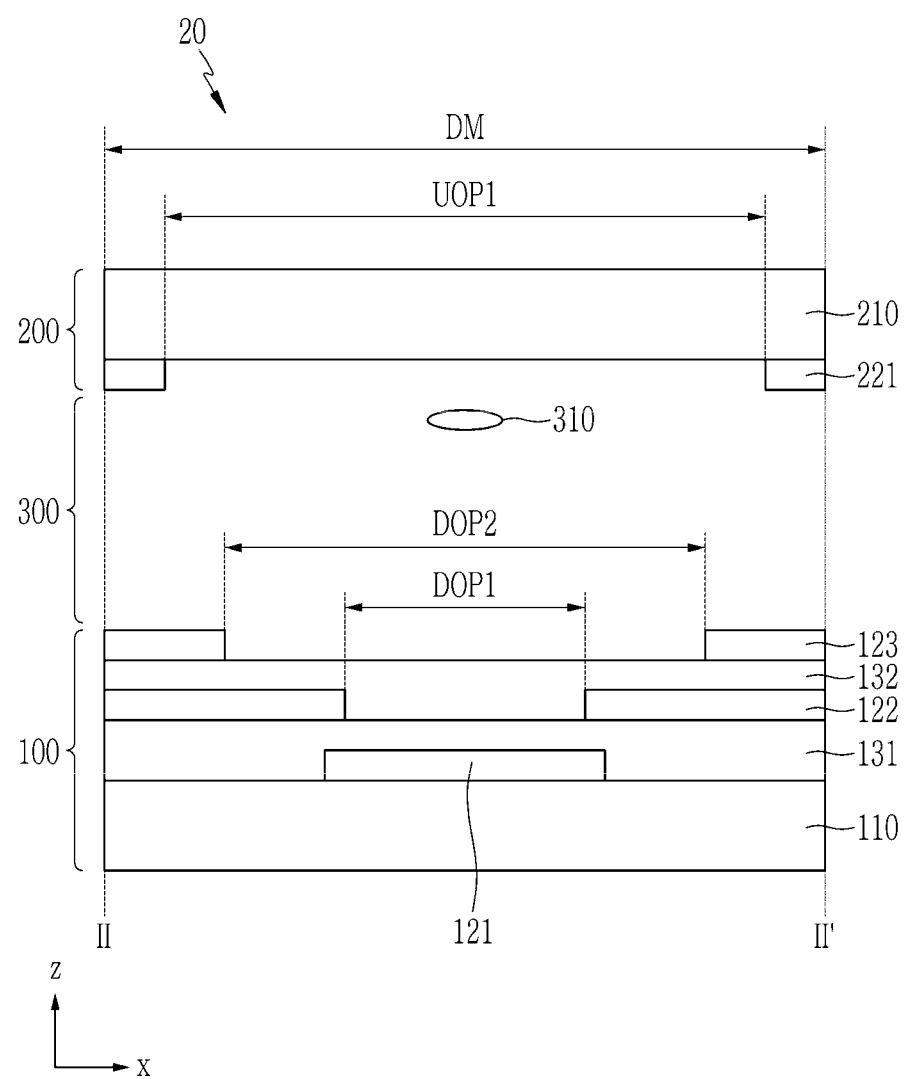
FIG. 2 is a cross-sectional view of a lens panel shown in FIG. 1 taken along a line II-II'.
Figure 3:
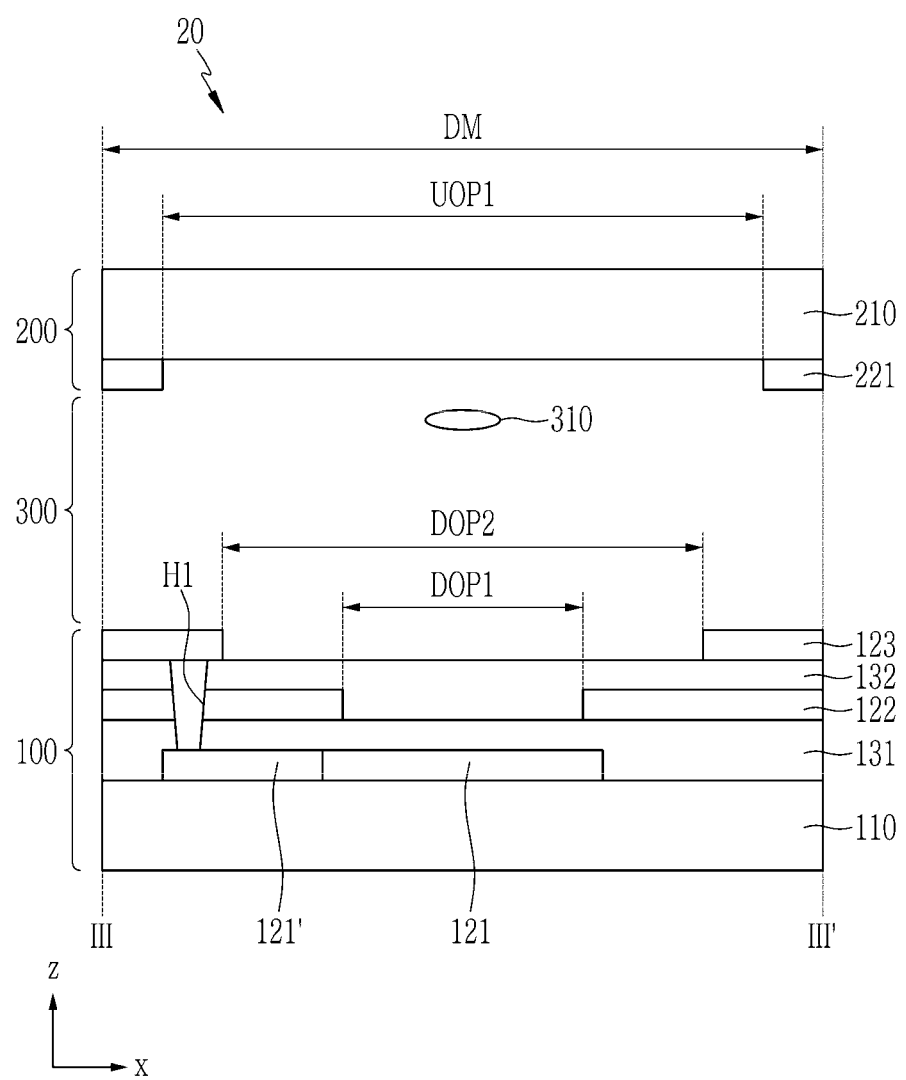
FIG. 3 is a cross-sectional view of a lens panel shown in FIG. 1 taken along a line III-III'.
Figure 4:
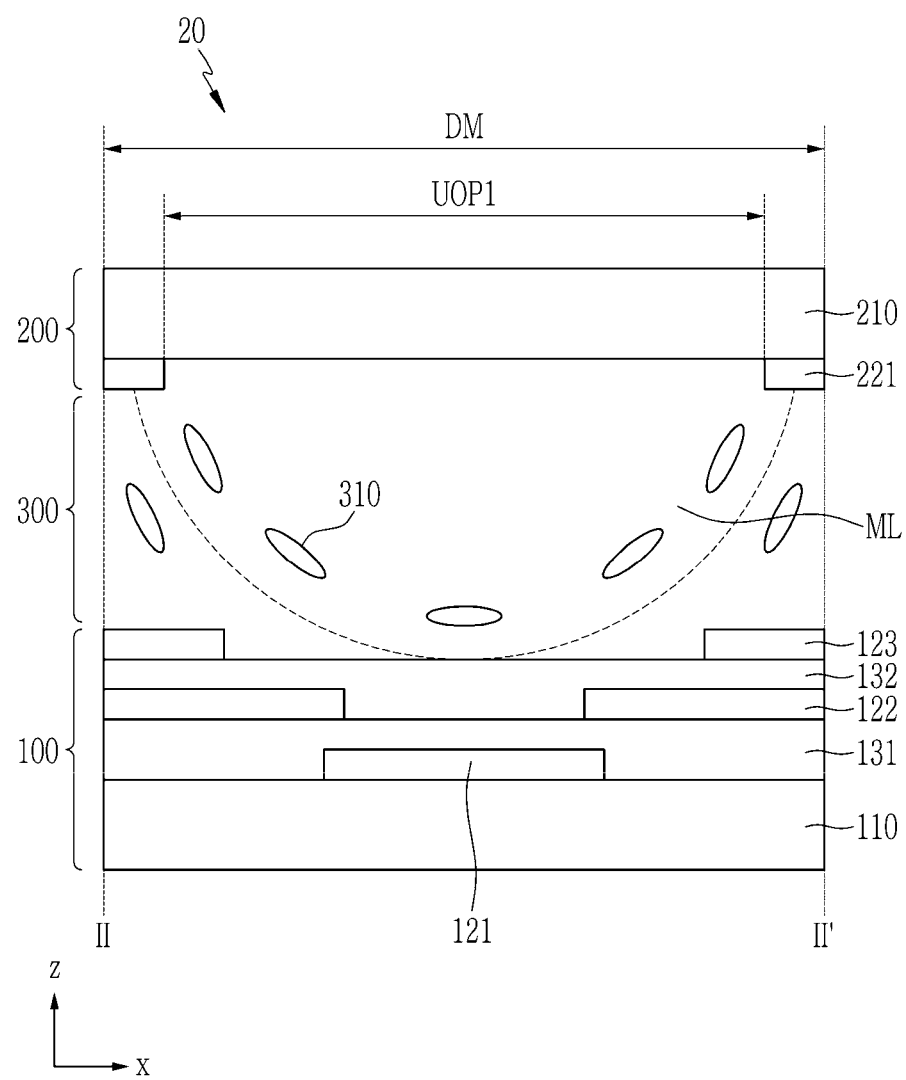
FIG. 4 is a view showing a second mode in which a lens is formed in a cross-sectional view of a lens panel shown in FIG. 1 taken along the line II-II'.
Figure 5:
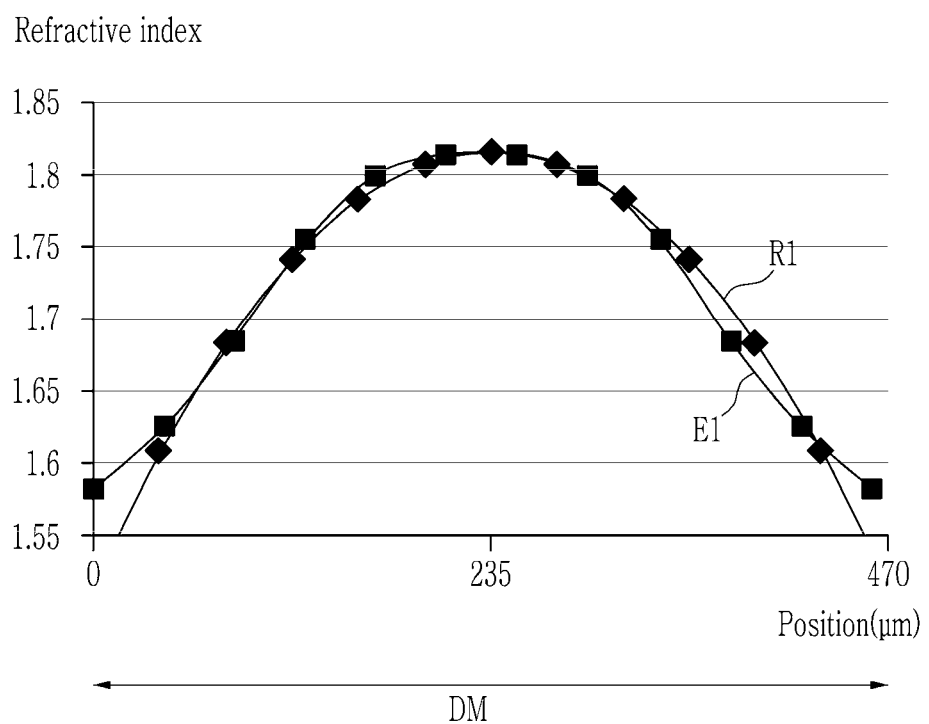
FIG. 5 is a graph showing a refractive index of a photomodulation unit when a lens panel show in FIG. 1 forms a lens.

FIG. 1 is a plane view of a lens panel according to an exemplary embodiment. FIG. 2 is a cross-sectional view of a lens panel shown in FIG. 1 taken along a line II-II'. FIG. 3 is a cross-sectional view of a lens panel shown in FIG. 1 taken along a line III-III'. FIG. 4 is a view showing a second mode in which a lens is formed in a cross-sectional view of a lens panel shown in FIG. 1 taken along a line II-II'. FIG. 5 is a graph showing a refractive index of a photomodulation unit when a lens panel show in FIG. 1 forms a lens.

Hereinafter, a first direction x and a second direction y cross each other, and a structure on a surface parallel to the first direction x and the second direction y is referred to as a structure on a plane. A direction perpendicular to the first direction x and the second direction y is referred to as a third direction z, and a structure on a surface parallel to one direction of the first direction x and the second direction y, and the third direction z, is referred to as a structure on a cross-section.

A part or an entire region of the lens panel 20 may be divided into a plurality of domains DM on a plane, and FIG. 1 shows one domain DM among the plurality of domains DM.

Firstly, referring to FIG. 1 to FIG. 4, the lens panel 20 according to an exemplary embodiment includes a first electrode unit 100, a second electrode unit 200, and a photomodulation unit 300. The first electrode unit 100 and the second electrode unit 200 face each other with the photomodulation unit 300 interposed therebetween.

The first electrode unit 100 includes a plurality of electrodes 121, 122, and 123 that are positioned at different layers. The plurality of electrodes 121, 122, and 123 included in the first electrode unit 100 are electrically connected to each other, thereby the same voltage may be applied to the plurality of electrodes 121, 122, and 123. The first electrode unit 100 may further include a first substrate 110.

In detail, the first electrode unit 100 may include a first electrode 121, a second electrode 122, and a third electrode 123. The first electrode 121 may be positioned on the first substrate 110. The first electrode 121 may be positioned at an approximate center of the domains DM. A first insulating layer 131 is positioned on the first electrode 121 and the first substrate 110. The first insulating layer 131 serves to planarize a top surface of the first electrode 121. The second electrode 122 is positioned on the first insulating layer 131. The second electrode 122 has a first opening DOP1. An opening means a region where the electrode is removed on a plane. The first opening DOP1 may be positioned at the approximate center of the domains DM, and the first electrode 121 may be positioned to overlap the first opening DOP1. The edge of the first electrode 121 may overlap the second electrode 122. That is, the first electrode 121 may have a wider area than the first opening DOP1. According to an exemplary embodiment, the first electrode 121 may have the same area as the first opening DOP1, and the edge of the first electrode 121 may overlap the edge of the first opening DOP1. A second insulating layer 132 is positioned on the second electrode 122 and the first insulating layer 131. The second insulating layer 132 serves to planarize the top surface of the second electrode 122. The third electrode 123 is positioned on the second insulating layer 132. The third electrode 123 has a second opening DOP2. The region of the second opening DOP2 may be wider than the region of the first opening DOP1, and the region of the first opening DOP1 may be included in the region of the second opening DOP2 on the plane structure. That is, the first opening DOP1 may overlap the second opening DOP2.

To electrically connect the first electrode 121, the second electrode 122, and the third electrode 123 to each other, a first branch unit 121' adjacent to the first electrode 121 may be positioned on the same layer as the first electrode 121. The first branch unit 121' may be physically and electrically connected to the first electrode 121. The first branch unit 121' may be formed of the same material as the first electrode 121. The first branch unit 121' overlaps the second electrode 122 and the third electrode 123.

A first contact hole H1 is positioned at a position where the first branch unit 121', the second electrode 122, and the third electrode 123 overlap each other. That is, at the position where the first branch unit 121', the second electrode 122, and the third electrode 123 overlap each other, the first insulating layer 131, the second electrode 122, and the second insulating layer 132 have the first contact hole H1. The first contact hole H1 is filled with a conductive material, thereby the first electrode 121, the second electrode 122, and the third electrode 123 may be electrically connected to each other through the first contact hole H1. The first contact hole H1 may be filled with the same material as the third electrode 123 when the third electrode 123 is formed.

The first substrate 110 may include a transparent insulator made of plastic or glass. The first electrode 121, the second electrode 122, and the third electrode 123 included in the first electrode unit 100 may include a transparent material having electrical conductivity such as ITO (indium tin oxide), IZO (indium zinc oxide), or a metal mesh having a fine pattern of a metal having high electrical conductivity. The first insulating layer 131 and the second insulating layer 132 may include a transparent organic insulating material or inorganic insulating material.

The second electrode unit 200 includes at least one corresponding electrode 221 overlapping at least one among a plurality of electrodes 121, 122, and 123 included in the first electrode unit 100. The second electrode unit 200 may further include a second substrate 210.

In detail, the second electrode unit 200 may include a first corresponding electrode 221. The first corresponding electrode 221 may be positioned on the second substrate 210. Hereinafter, the phrase "on the second substrate 210" means on the surface of the second substrate 210 facing the first electrode unit 100. That is, in a cross-sectional structure, the first corresponding electrode 221 may be positioned between the second substrate 210 and the photomodulation unit 300. The first corresponding electrode 221 has a first corresponding opening UOP1. The region of the first corresponding opening UOP1 may be wider than the region of the second opening DOP2, and the region of the second opening DOP2 may be included in the region of the first corresponding opening UOP1. That is, the second opening DOP2 may overlap the first corresponding opening UOP1. Also, the first opening DOP1 may overlap the first corresponding opening UOP1.

The second substrate 210 may include a transparent insulator made of plastic or glass. The first corresponding electrode 221 included in the second electrode unit 200 may include the transparent material having electrical conductivity such as ITO, IZO, or a metal mesh having a fine pattern of a metal having electrical conductivity.

Meanwhile, at least one of the first substrate 110 and the second substrate 210 may be omitted depending on a method of forming or attaching to a device to which the lens panel 20 is applied. For example, the first electrode 121 of the lens panel 20 may be directly formed on the display panel (referring to the display panel 10 of FIG. 10 to FIG. 13), and in this case, the first substrate 110 may be omitted. Also, the first corresponding electrode 221 of the lens panel 20 may be directly formed on the display panel 10, and in this case, the second substrate 210 may be omitted.

The photomodulation unit 300 may control a light path of light emitted from the display panel 10. That is, the photomodulation unit 300 as a switchable photomodulation layer controls a phase of the transmitted light, thereby controlling the path of the light. For example, the photomodulation unit 300 may be a liquid crystal layer including a plurality of anisotropic liquid crystal molecules 310. The liquid crystal molecules 310 may have positive dielectric anisotropy, but are not limited thereto. A width of the photomodulation unit 300 in the third direction z, that is, a gap between the first electrode unit 100 and the second electrode unit 200, for example, may be about 3 micrometers to about 30 micrometers, but is not limited thereto.

A refractive index distribution of the photomodulation unit 300 is differentiated depending on a voltage difference of the voltage applied to the plurality of electrodes 121, 122, and 123 included in the first electrode unit 100 and the voltage applied to the electrode 221 included in the second electrode unit 200, thereby controlling the light path of the light. The photomodulation unit 300 may be operated with a plurality of modes, including a first mode and a second mode, depending on the voltage difference between the electrodes 121, 122, and 123 included in the first electrode unit 100 and the electrode 221 included in the second electrode unit 200.

In the first mode, the voltage difference between the electrodes 121, 122, and 123 included in the first electrode unit 100 and the electrode 221 included in the second electrode unit 200 may be a minimum voltage difference, and for example, may be 0 V. In the first mode, an arrangement direction of the liquid crystal molecules 310 of the domains DM, that is, a direction of a long axis of the liquid crystal molecules 310, may be constant. For example, in the first mode, the liquid crystal molecules 310 may be arranged such that the long axes thereof may be approximately parallel to the surface of the first electrode unit 100 or the second electrode unit 200. However, it is not limited thereto, and in the first mode, the liquid crystal molecules 310 may be arranged such that the long axes thereof may be approximately perpendicular to the surface of the first electrode unit 100 or the second electrode unit 200.

In the second mode, the different voltages are applied to the electrodes 121, 122, and 123 included in the first electrode unit 100 and the electrode 221 included in the second electrode unit 200. Accordingly, if the appropriate voltage difference is generated between the electrodes 121, 122, and 123 included in the first electrode unit 100 and the electrode 221 included in the second electrode unit 200, an electric field is generated between the first corresponding electrode 221 of the second electrode unit 200 and the plurality of electrodes 121, 122, and 123 of the first electrode unit 100, thereby the liquid crystal molecules 310 are re-arranged depending on the electric field. When the liquid crystal molecules 310 have positive dielectric anisotropy, the liquid crystal molecules 310 may be arranged in the direction parallel to the direction of the electric field.

In the second mode, the liquid crystal molecules 310 positioned in one domain DM are inclined with different angles depending on the positions in the domain DM. Accordingly, the photomodulation unit 300 may form different refractive index distributions depending on the positions in one domain DM, and the light may experience different phase delays depending on the positions in the domain DM. In detail, the liquid crystal molecules 310 positioned near the center of the domain DM may be arranged to be approximately parallel to the surface of the first electrode unit 100 or the second electrode unit 200, and the liquid crystal molecules 310 positioned near the edge of the domain DM may be approximately inclined toward the center of the domain DM. The inclination angle of the liquid crystal molecules 310 may increase closer to the edge of the domain DM with respect to the surface of the first electrode unit 100 or the second electrode unit 200. Accordingly, in the domain DM, a shape in which the liquid crystal molecules 310 are arranged is approximately similar to a convex lens, and the photomodulation unit 300 of the domain DM may form the lens ML capable of changing the light path of the transmitted light. The lens ML may be a microlens capable of refracting the light in the viewing angle of all directions, differently from a lenticular lens.

In a plane, one lens ML may be approximately formed corresponding to one domain DM.

As described above, when the first electrode unit 100 includes the plurality of electrodes 121, 122, and 123 positioned at different layers from each other, even if a pitch of the lens ML is larger than 100 micrometers, the refractive index of the lens ML may be approximate to an ideal optical shape having an optimized refractive index. That is, an aberration of the lens ML may appear to be very low.

FIG. 5 is a graph showing a simulation result of a refractive index E1 of the lens ML formed in the lens panel 20 when the width in the first direction x or the second direction y of the domain DM in the lens panel 20 according to an exemplary embodiment is 470 micrometers, the width in the first direction x of the first electrode 121 and the width in the first direction x of the first opening DOP1 of the second electrode 122 are 150 micrometers, the width of the second opening DOP2 of the third electrode 123 is 310 micrometers, and the width of the edge of the first opening DOP1 and the edge of the second opening DOP2 is 80 micrometers. It may be seen that the refractive index E1 of the lens ML formed in the lens panel 20 is close to the refractive index R1 of a reference lens with the ideal optical shape. That is, it may be seen that the aberration of the lens ML is very low.

If each of the first electrode unit 100 and the second electrode unit 200 only included one electrode, when the pitch of the lens ML is larger than 100 micrometers, the aberration of the lens ML may be very large. This will be described referring to FIG. 6 and FIG. 7.

Figure 6:
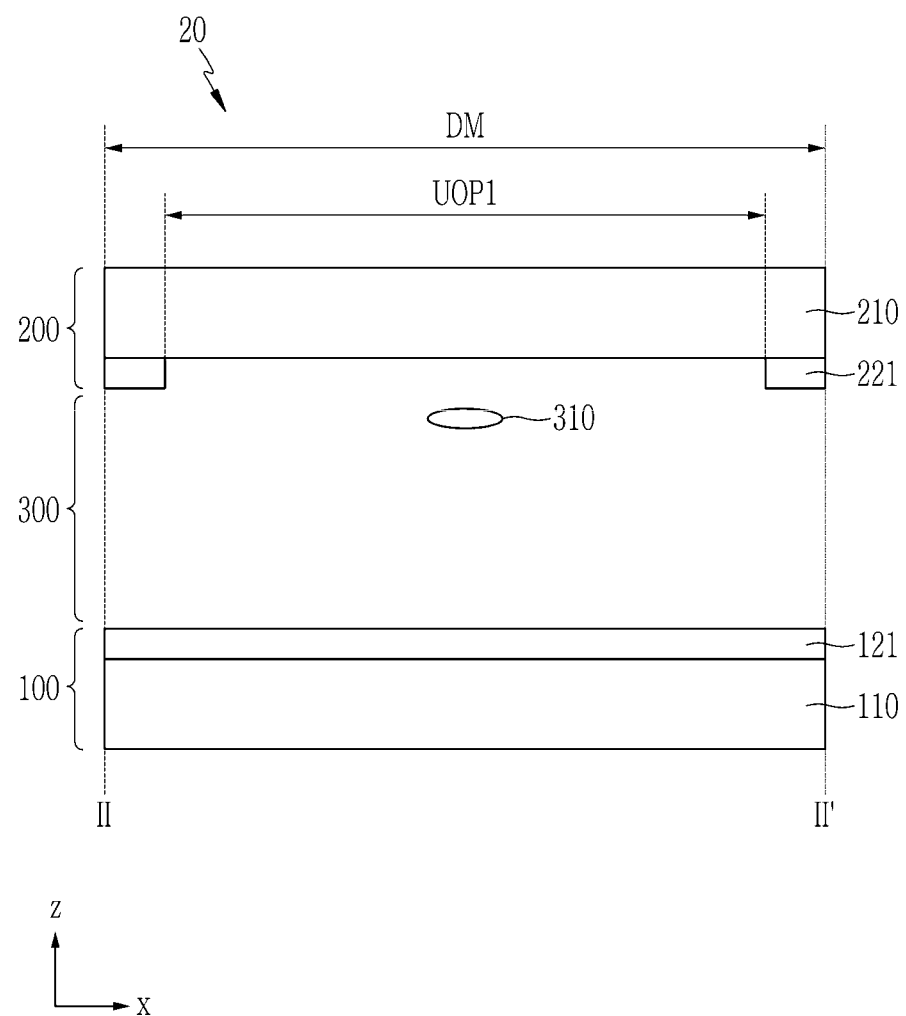
FIG. 6 is a cross-sectional view showing a lens panel according to a comparative example.
Figure 7:
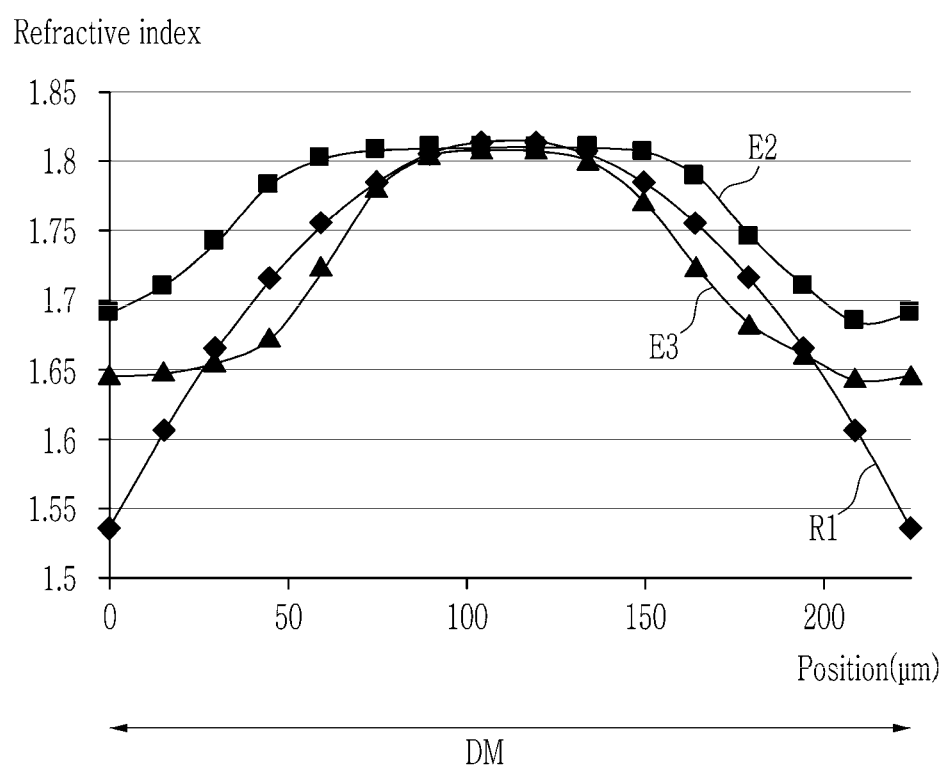
FIG. 7 is a graph showing a refractive index of a photomodulation unit when a lens panel show in FIG. 6 forms a lens.

FIG. 6 is a cross-sectional view showing a lens panel according to a comparative example. FIG. 7 is a graph showing a refractive index of a photomodulation unit when a lens panel show in FIG. 6 forms a lens.

Referring to FIG. 6 and FIG. 7, the first electrode unit 100 in the lens panel according to the comparative example includes one first electrode 121 formed on the entire surface of the first substrate 110, and the second electrode unit 200 includes one first corresponding electrode 221 having the first corresponding opening UOP1. In this case, the width in the first direction x or the second direction y of the domains DM is 230 micrometers.

It may be seen that the refractive index of the lens formed at the photomodulation unit 300 by applying the different voltages to the first electrode 121 and the first corresponding electrode 221 has a large difference for the refractive index R1 of the reference lens of the ideal optical shape like in FIG. 7. For example, it may be seen that the refractive index E2 in the case that the voltage difference of the first electrode 121 and the first corresponding electrode 221 is 3.9 V and the refractive index E in the case of 36.0 V has the large difference for the refractive index R1 of the reference lens except for some positions.

As described above, as the first electrode unit 100 of the lens panel 20 according to an exemplary embodiment includes the plurality of electrodes 121, 122, and 123 that are positioned at the different layers and connected to each other, the aberration of the lens ML formed in the photomodulation unit 300 may be mitigated.

Next, the arrangement of the plurality of domains DM in the lens panel 20 according to an exemplary embodiment will be described with reference to FIG. 8 and FIG. 9.

Figure 8:
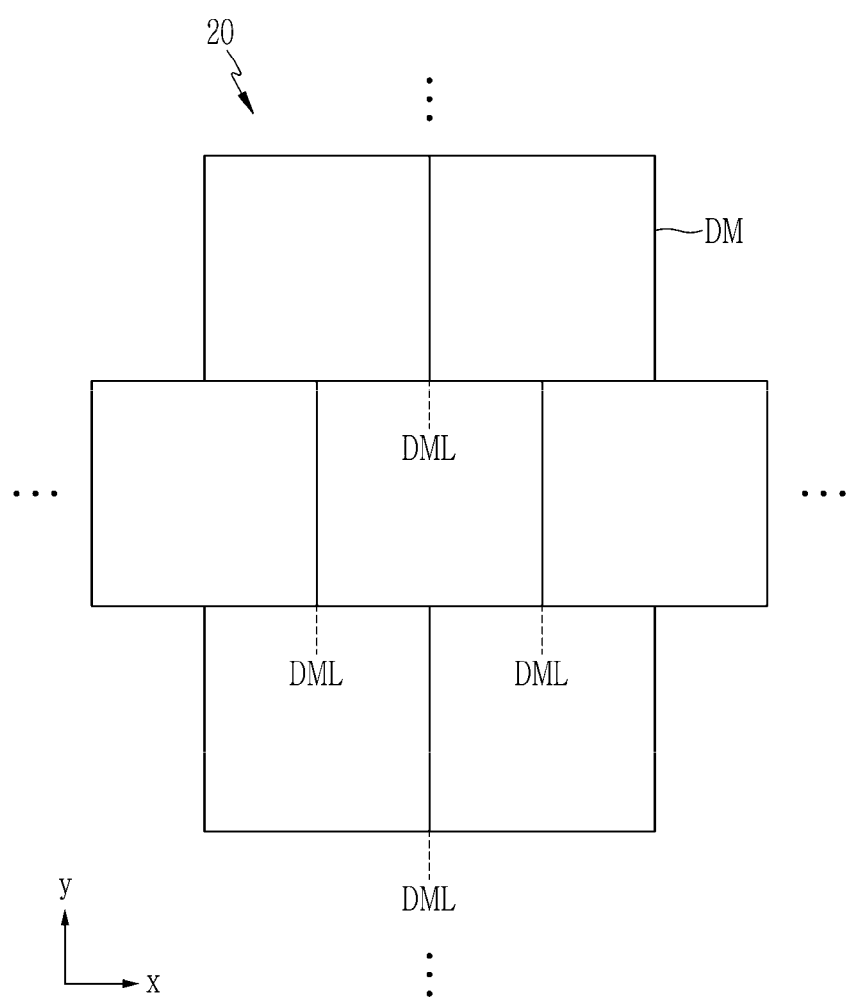
FIG. 8 a top plan view showing an arrangement of a domain of a lens panel according to an exemplary embodiment.

FIG. 8 a top plan view showing an arrangement of a domain of a lens panel according to an exemplary embodiment.

Referring to FIG. 8, the plurality of domains DM divided in a plane in the lens panel 20 according to an exemplary embodiment may be arranged in a plurality of rows each in the first direction x. In this case, domain boundaries DML between the plurality of domains DM arranged in one row in the first direction x may be misaligned with domain boundaries DML between the plurality of domains DM arranged at another adjacent row.

Figure 9:
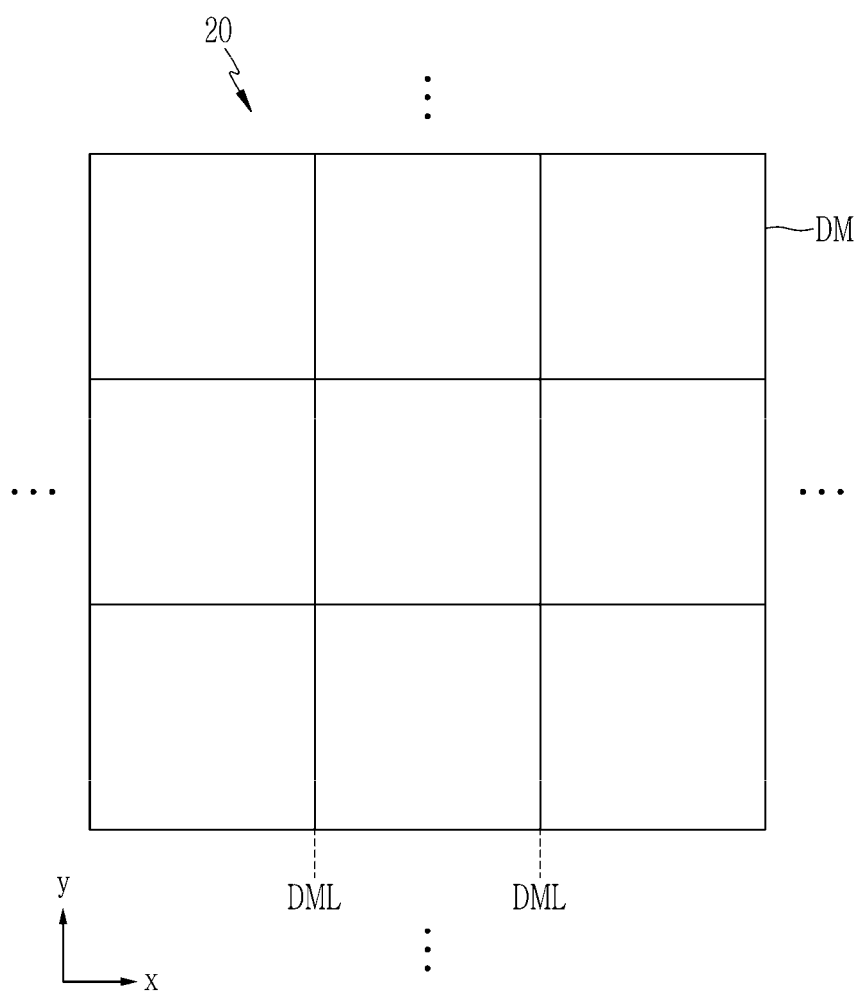
FIG. 9 a top plan view showing an arrangement of a domain of a lens panel according to another exemplary embodiment.

FIG. 9 a top plan view showing an arrangement of a domain of a lens panel according to another exemplary embodiment.

Referring to FIG. 9, in the lens panel 20 according to an exemplary embodiment, the plurality of domains DM may be arranged in a plurality of rows in the first direction x and in a plurality of columns of the second direction y. In this case, domain boundaries DML between the plurality of domains DM arranged in one row of the first direction x may be aligned with domain boundaries DML between the plurality of domains DM arranged in another row.

In the above, it is described that a shape of the domain DM is a quadrangle and a shape of the plurality of openings DOP1, DOP2, and UOP1 is a quadrangle. However, it is not limited thereto, and the domains DM may be made as polygons of various shapes, and the plurality of openings DOP1, DOP2, and UOP1 may be made as polygons of various shapes or as circles. Accordingly, the plurality of domains DM may be arranged in various shapes, however the present inventive concept is not limited thereto.

Next, a stereoscopic image display device 1000 including the lens panel 20 according to an exemplary embodiment will be described with reference to FIG. 10 to FIG. 13.

Figure 10:
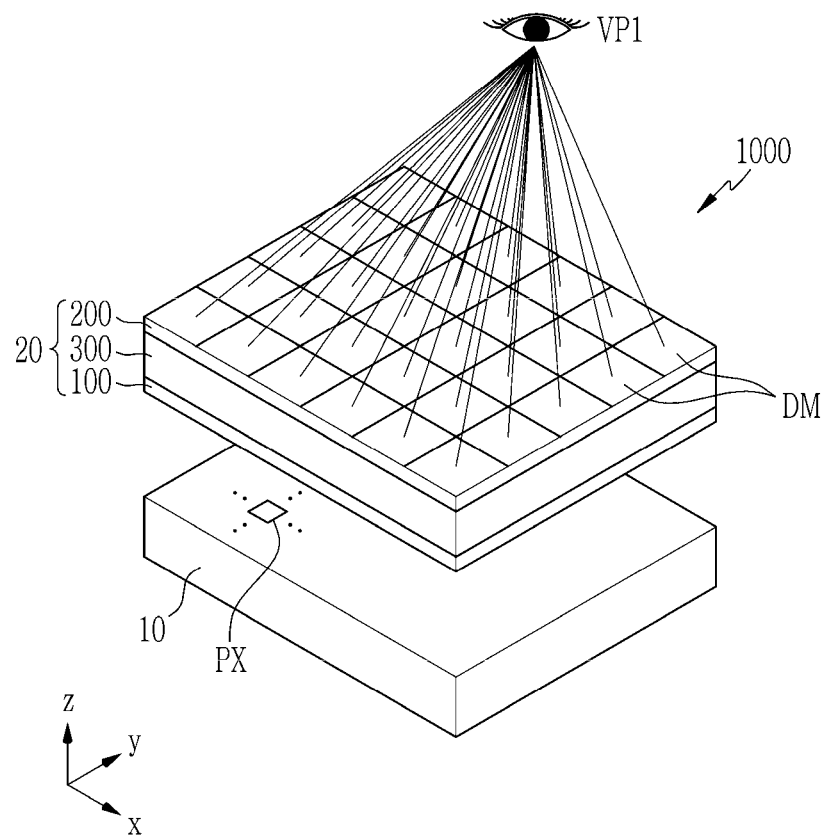
FIG. 10 and FIG. 11 are views schematically showing a method of displaying an image by a stereoscopic image display device including a lens panel according to an exemplary embodiment at one viewing point region.
Figure 11:
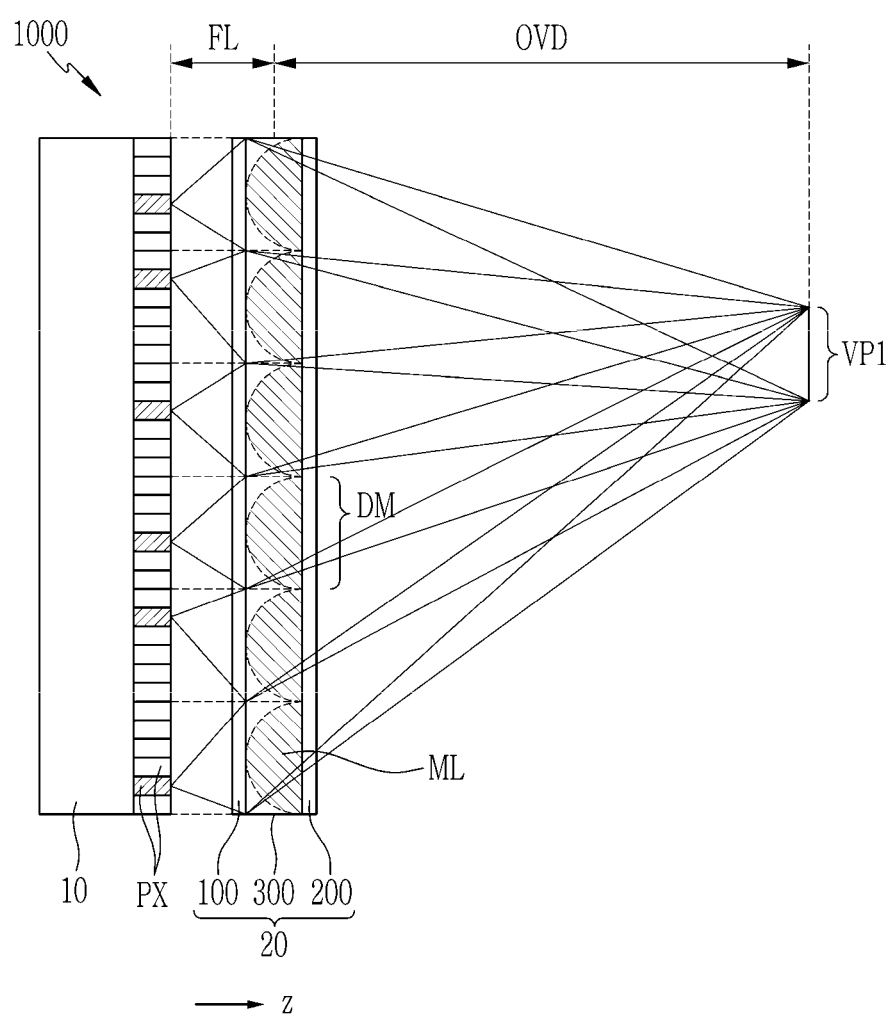
Figure 12:
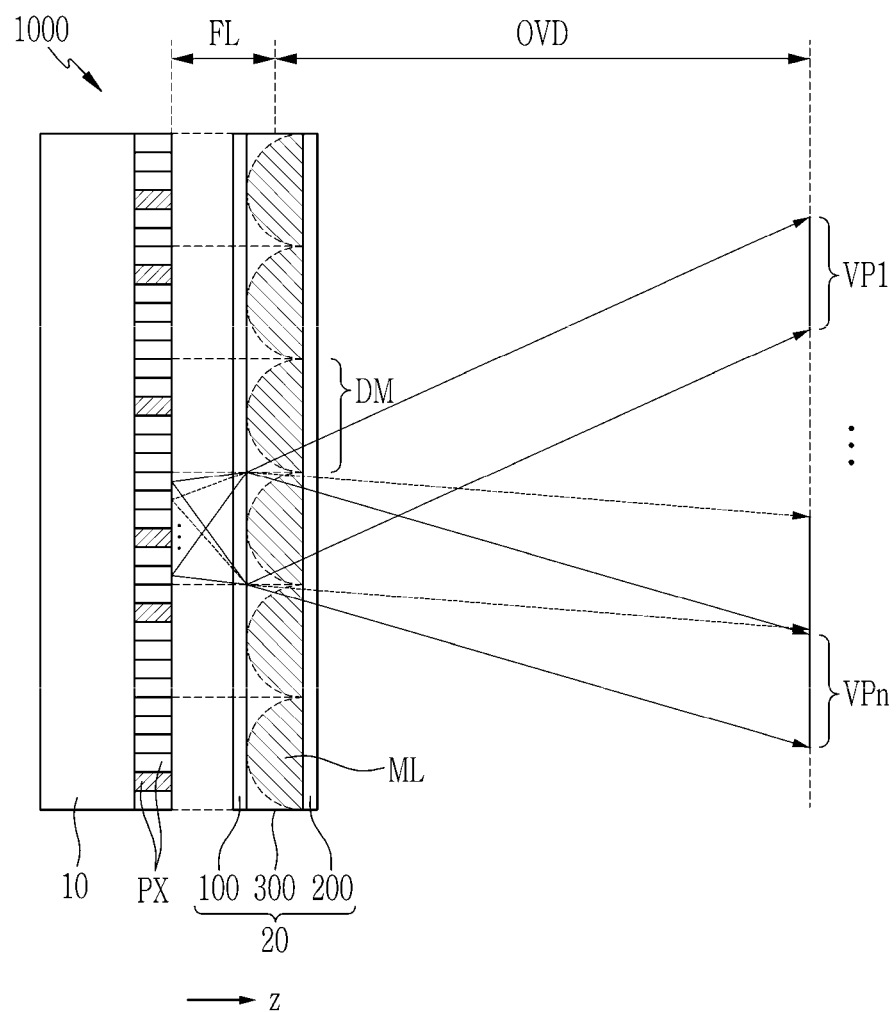
FIG. 12 is a view schematically showing a method of displaying an image by a stereoscopic image display device including a lens panel according to an exemplary embodiment at various viewing point regions.

FIG. 10 and FIG. 11 are views schematically showing a method of displaying an image by a stereoscopic image display device including a lens panel according to an exemplary embodiment at one viewing point region. FIG. 12 is a view schematically showing a method of displaying an image by a stereoscopic image display device including a lens panel according to an exemplary embodiment at various viewing point regions.

Referring to FIG. 10 to FIG. 12, the stereoscopic image display device 1000 according to an exemplary embodiment may be operated in a 3D mode so that different images may be displayed to be observed at a plurality of viewing point regions VP1-VPn. In the 3D mode, the lens panel 20 is operated with the above-described second mode, thereby forming the plurality of lens ML at the photomodulation unit 300. As described above, the stereoscopic image display device 1000 may display the difference images at a plurality of viewing point regions VP1-VPn in the 3D mode.

A distance between a surface where the display panel 10 displays the image and a cross-sectional center of the lens ML formed at the lens panel 20 may be a focal length FL of the lens ML. The distance between the cross-sectional center of the lens ML formed at the lens panel 20 and a position where the optimized stereoscopic image may be observed is referred to as an optimal viewing distance (OVD).

In the 3D mode, each pixel PX of the display panel 10 displays the image corresponding to any one of the viewing point regions VP1-VPn, and the image displayed by each pixel PX may be observed at the corresponding viewing point regions VP1-VPn through the lens panel 20 of the second mode. A left eye and a right eye of a viewer respectively recognize and/or differentiates the images of the different viewing point regions VP1-VPn from each other, thereby feeling depth perception and stereoscopic perception.

Each domain DM of the lens panel 20 overlaps two or more pixels PX of the display panel 10 on a plane, and the light of the image displayed by the pixel PX overlapping each domain DM may pass through the corresponding domain DM. The light from the pixels PX corresponding to each domain DM may be refracted in the different directions from each other depending on the position in the domain DM. That is, pixels PX corresponding to each domain DM may display images corresponding to different viewing point regions VP1-VPn from each other, and the pixels PX corresponding to each domain DM may display the image corresponding to most of the viewing point regions VP1-VPn.

For example, the image of the pixel PX corresponding to the first viewing point region VP1, among the images of the plurality of pixels PX incident to the plurality of domains DM, may be observed in the first viewpoint region VP1 through the lens ML of each domain DM.

The images of the plurality of pixels PX corresponding to one domain DM may be refracted in different directions from each other through the different portions of the lens ML of the domain DM, and then may be observed in the viewing point regions VP1-VPn different from each other.

The refractive index E1 of the lens ML formed by the lens panel 20 according to an exemplary embodiment is close to the refractive index R1 of the reference lens of the ideal optical shape such that the image of the plurality of pixels PX may correctly reach the desired viewing point regions VP1-VPn. Accordingly, crosstalk in which the image of one viewing point region is observed at another viewing point region may be reduced, and the characteristic of the stereoscopic image display device 1000 may be improved.

Figure 13:
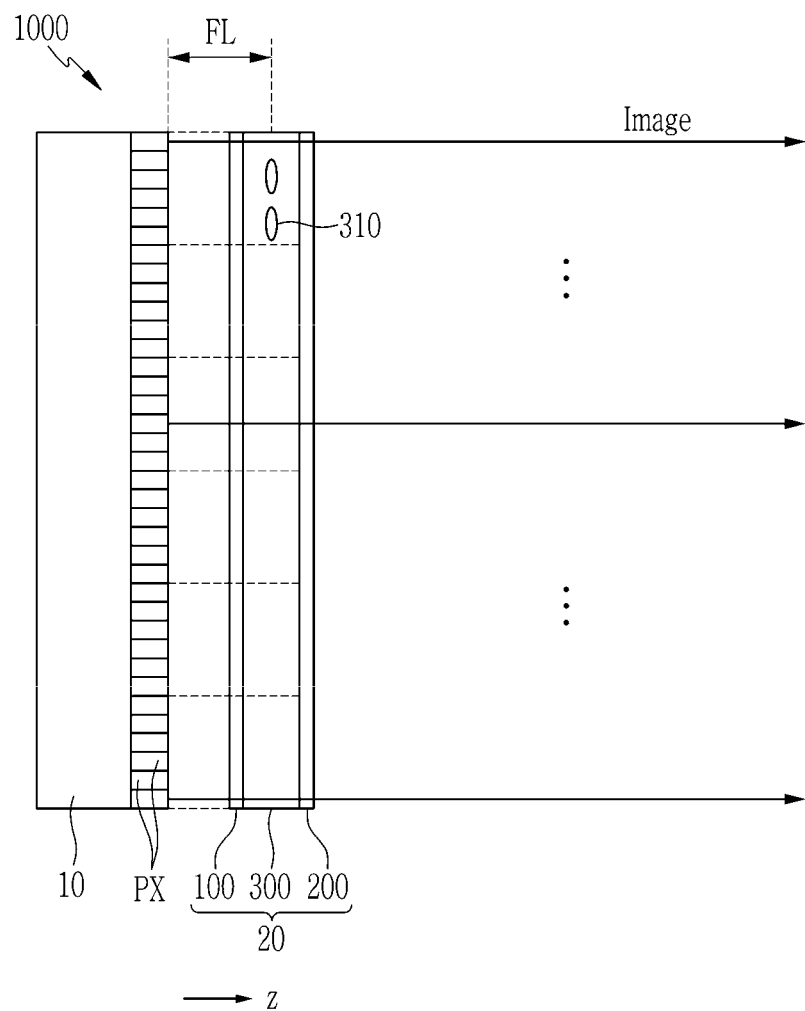
FIG. 13 is a view schematically showing a method of displaying a 2D image by a stereoscopic image display device including a lens panel according to an exemplary embodiment.

FIG. 13 is a view schematically showing a method of displaying a 2D image by a stereoscopic image display device including a lens panel according to an exemplary embodiment.

Referring to FIG. 13, in the 2D mode, the lens panel 20 is operated with the above-described first mode such that the lens ML is not formed at the photomodulation unit 300 and the liquid crystal molecules 310 may be arranged in a constant direction. That is, the lens panel 20 is turned off in the 2D mode such that the image displayed in the display panel 10 may be recognized as the 2D image as it is displayed through the lens panel 20.

Next, various exemplary embodiments of the lens panel 20 will be described in FIG. 14 to FIG. 30. Differences from the lens panel 20 according to the exemplary embodiment described in FIG. 1 to FIG. 4 will be mainly described.

Figure 14:
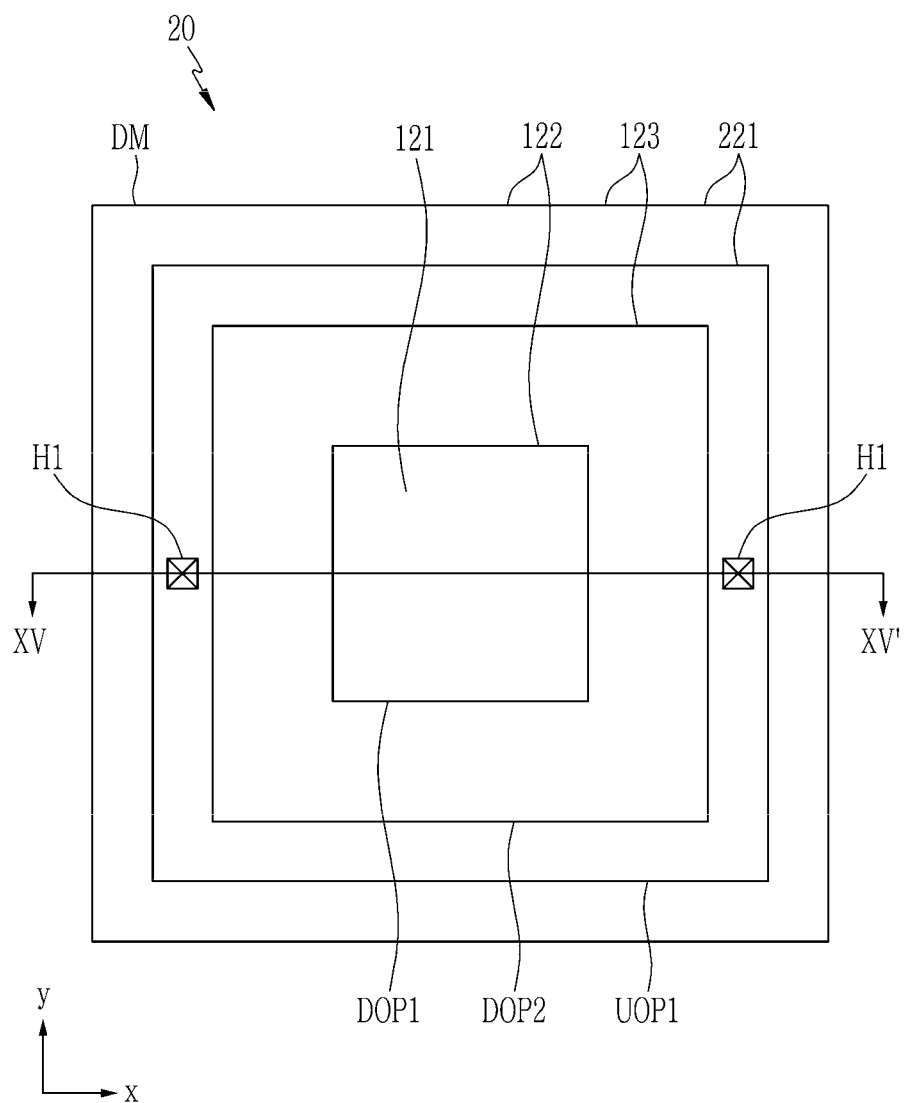
FIG. 14 is a plane view of a lens panel according to another exemplary embodiment.
Figure 15:
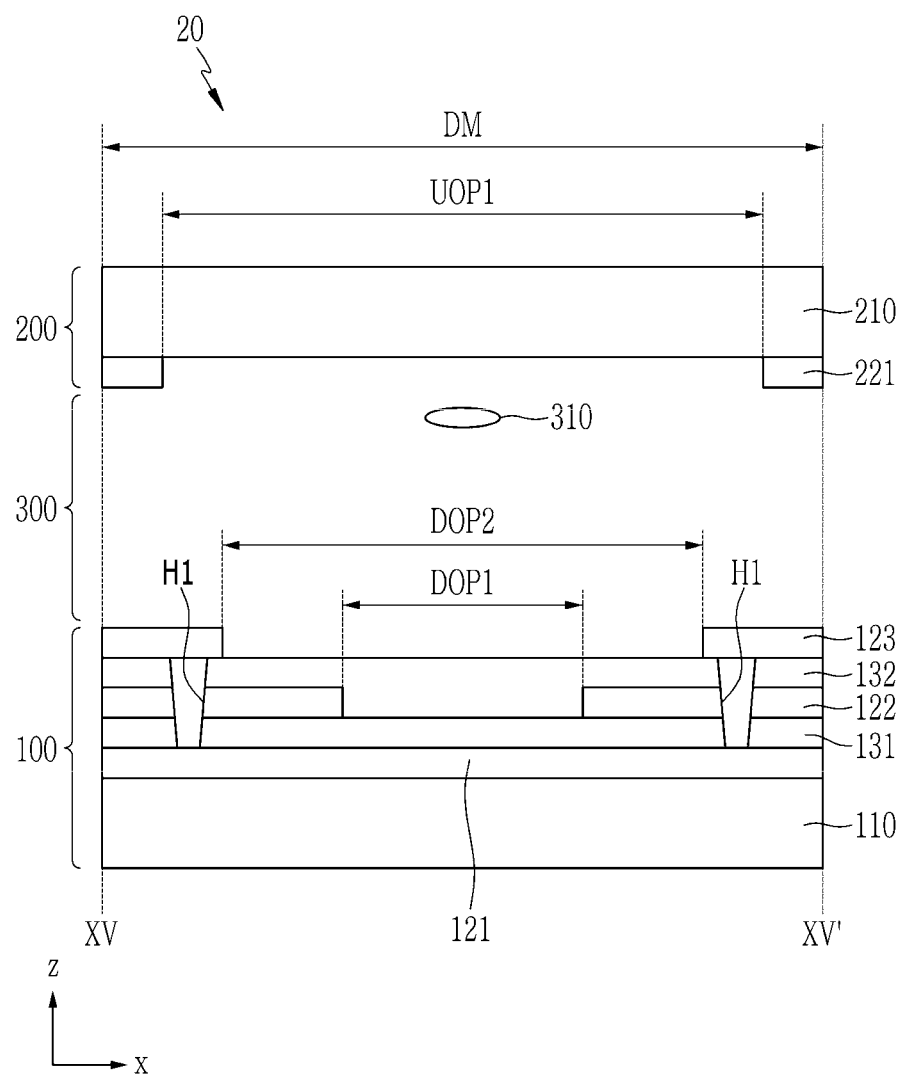
FIG. 15 is a cross-sectional view of a lens panel shown in FIG. 14 taken along a line XV-XV'.

FIG. 14 is a plane view of a lens panel according to another exemplary embodiment. FIG. 15 is a cross-sectional view of a lens panel shown in FIG. 14 taken along a line XV-XV'.

Referring to FIG. 14 and FIG. 15, a first electrode 121 may be positioned on an entire surface of a first substrate 110 for one domain DM. That is, the first electrode 121 may overlap a second electrode 122 and a third electrode 123. In this case, the first branch unit 121' is omitted.

A first contact hole H1 is positioned where the first electrode 121, the second electrode 122, and the third electrode 123 overlap each other. That is, the overlapping position of the first electrode 121, the second electrode 122, and the third electrode 123, the first insulating layer 131, the second electrode 122, and the second insulating layer 132 may have the first contact hole H1.

Except for the differences, the characteristics of the exemplary embodiments described with reference to FIG. 1 to FIG. 13 may all be applied to the exemplary embodiment described with reference to FIG. 14 and FIG. 15 such that the description for the exemplary embodiment described in FIG. 1 to FIG. 13 is omitted.

Figure 16:
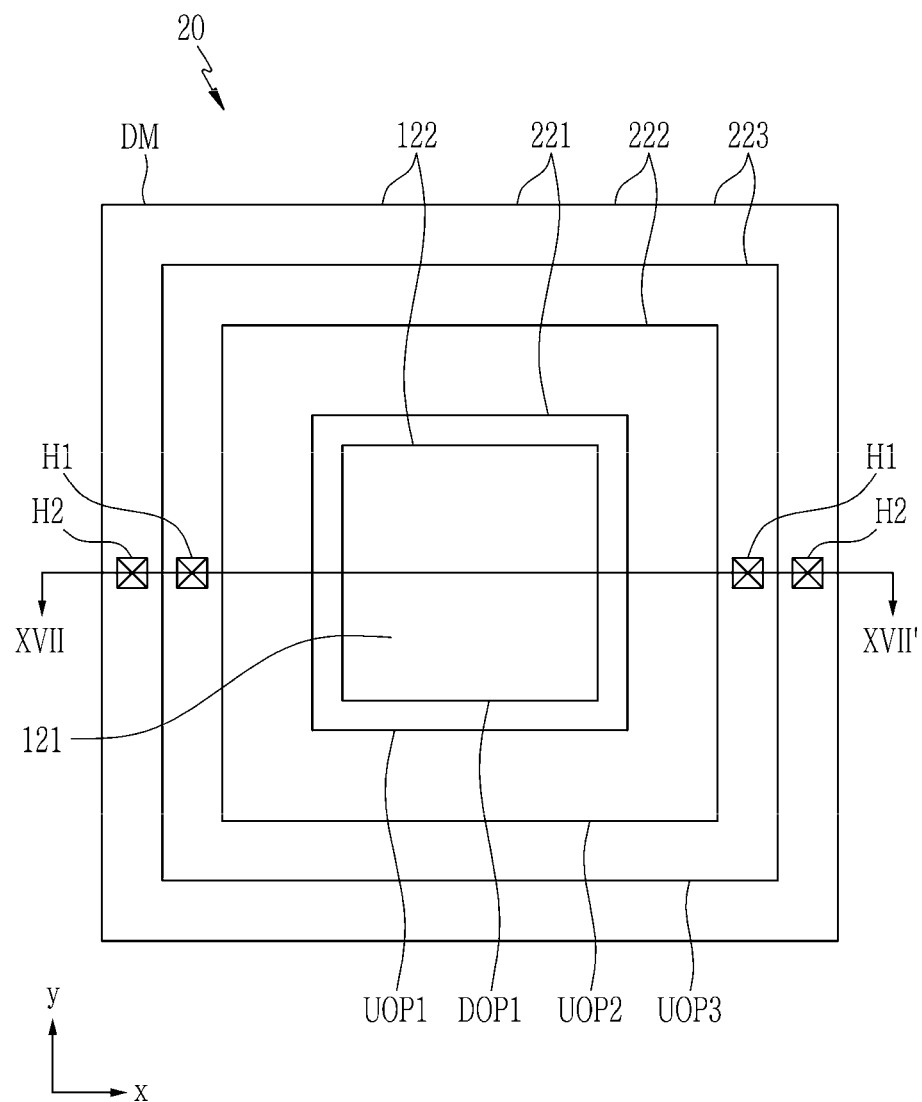
FIG. 16 is a plane view of a lens panel according to another exemplary embodiment.
Figure 17:
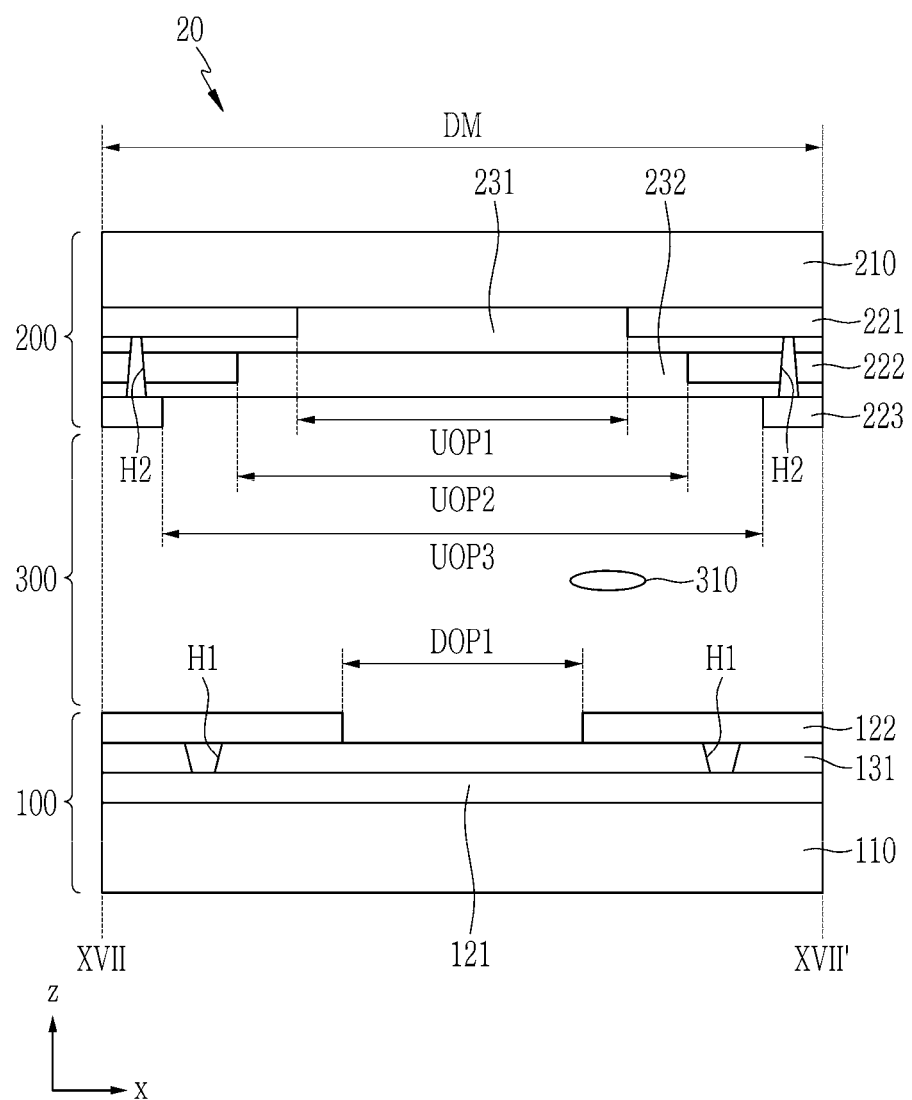
FIG. 17 is a cross-sectional view of a lens panel shown in FIG. 16 taken along a line XVII-XVII'.

FIG. 16 is a plane view of a lens panel according to another exemplary embodiment. FIG. 17 is a cross-sectional view of a lens panel shown in FIG. 16 taken along a line XVII-XVII'.

Referring to FIG. 16 and FIG. 17, for one domain DM, the first electrode 121 is positioned on the entire surface of the first substrate 110. In this case, the first branch unit 121', the second insulating layer 132, and the third electrode 123 are omitted. That is, the first electrode 121 may overlap the second electrode 122, and the first contact hole H1 is positioned where the first electrode 121 and the second electrode 122 are overlapped. At the overlapping position of the first electrode 121 and the second electrode 122, the first insulating layer 131 may have the first contact hole H1, and the first electrode 121 and the second electrode 122 may be connected to each other.

The second electrode unit 200 includes a plurality of corresponding electrodes 221, 222, and 223 that are positioned at the different layers. The plurality of corresponding electrodes 221, 222, and 223 included in the second electrode unit 200 are electrically connected to each other such that the same voltage may be applied to the plurality of corresponding electrodes 221, 222, and 223.

In detail, the second electrode unit 200 may include a first corresponding electrode 221, a second corresponding electrode 222, and a third corresponding electrode 223. The first corresponding electrode 221 may be positioned on the second substrate 210. The first corresponding electrode 221 may have a first corresponding opening UOP1. The first corresponding opening UOP1 may overlap the first opening DOP1, and the region of the first corresponding opening UOP1 may be wider than or equal to the region of the first opening DOP1. A first corresponding insulating layer 231 is positioned on the first corresponding electrode 221 and the second substrate 210. The second corresponding electrode 222 is positioned on the first corresponding insulating layer 231. The second corresponding electrode 222 may have a second corresponding opening UOP2. The region of the second corresponding opening UOP2 may be wider than the region of the first corresponding opening UOP1, and the region of the first corresponding opening UOP1 may be included in the region of the second corresponding opening UOP2. That is, the first corresponding opening UOP1 may overlap the second corresponding opening UOP2. A second corresponding insulating layer 232 is positioned on the second corresponding electrode 222 and the first corresponding insulating layer 231. The third corresponding electrode 223 is positioned on the second corresponding insulating layer 232. The third corresponding electrode 223 may have a third corresponding opening UOP3. The region of the third corresponding opening UOP3 may be wider than the region of the second corresponding opening UOP2, and the region of the second corresponding opening UOP2 may be included in the region of the third corresponding opening UOP3. That is, the second corresponding opening UOP2 may overlap the third corresponding opening UOP3. A second contact hole H2 is positioned where the first corresponding electrode 221, the second corresponding electrode 222, and the third corresponding electrode 223 are overlapped. That is, at the overlapping position of the first corresponding electrode 221, the second corresponding electrode 222, and the third corresponding electrode 223, the first corresponding insulating layer 231, the second corresponding electrode 222, and the second corresponding insulating layer 232 may have a second contact hole H2. The conductive material is filled to the second contact hole H2, and the first corresponding electrode 221, the second corresponding electrode 222, and the third corresponding electrode 223 may be electrically connected to each other through the second contact hole H2.

The second substrate 210 may include a transparent insulator made of plastic or glass. The first corresponding electrode 221, the second corresponding electrode 222, and the third corresponding electrode 223 included in the second electrode unit 200 include the transparent material having electrical conductivity such as ITO, IZO, or the metal mesh having the fine pattern of the metal having electrical conductivity.

The first corresponding insulating layer 231 and the second corresponding insulating layer 232 may include the transparent organic insulating material, the inorganic insulating material, or the like.

Except for these differences, characteristics of the exemplary embodiment described with reference to FIG. 1 to FIG. 13 may be all applied to the exemplary embodiment described with reference to FIG. 16 and FIG. 17 such that the description of the characteristics of the exemplary embodiment described in FIG. 1 to FIG. 13 is omitted.

Figure 18:
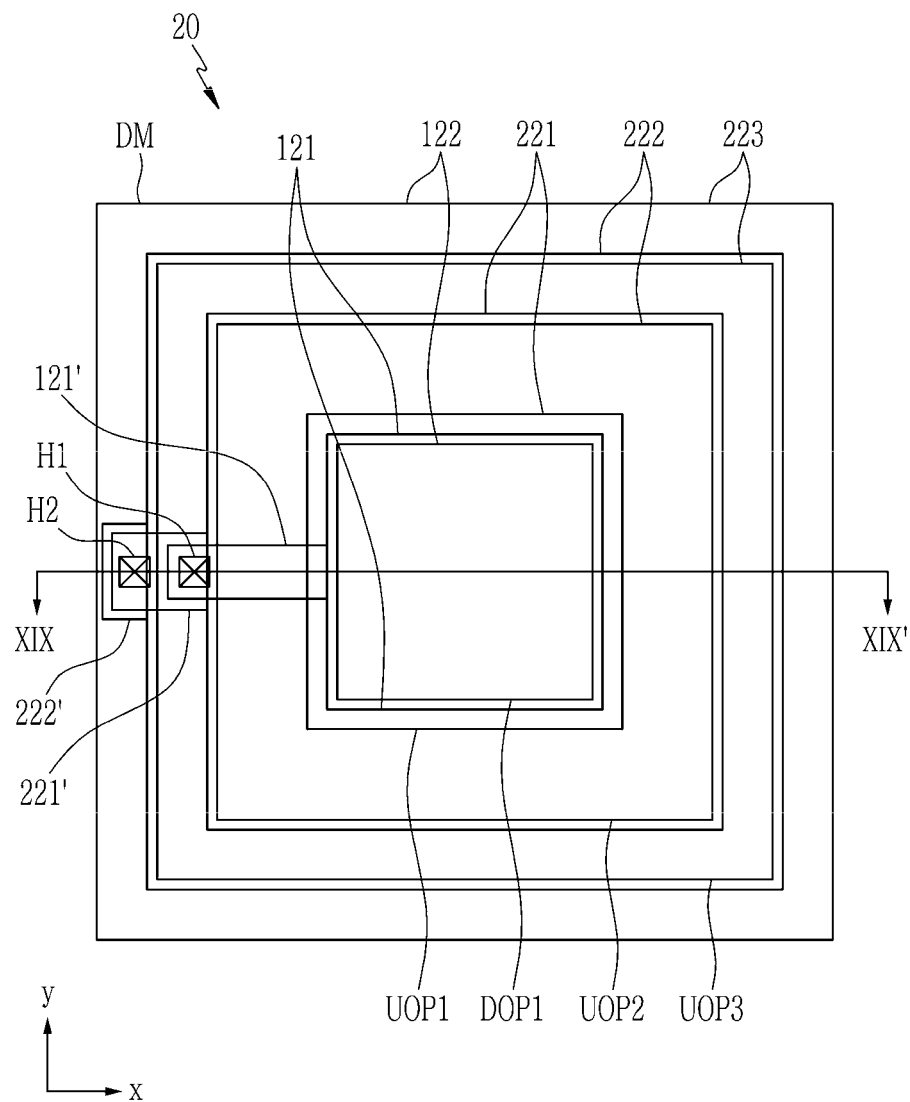
FIG. 18 is a plane view of a lens panel according to another exemplary embodiment.
Figure 19:
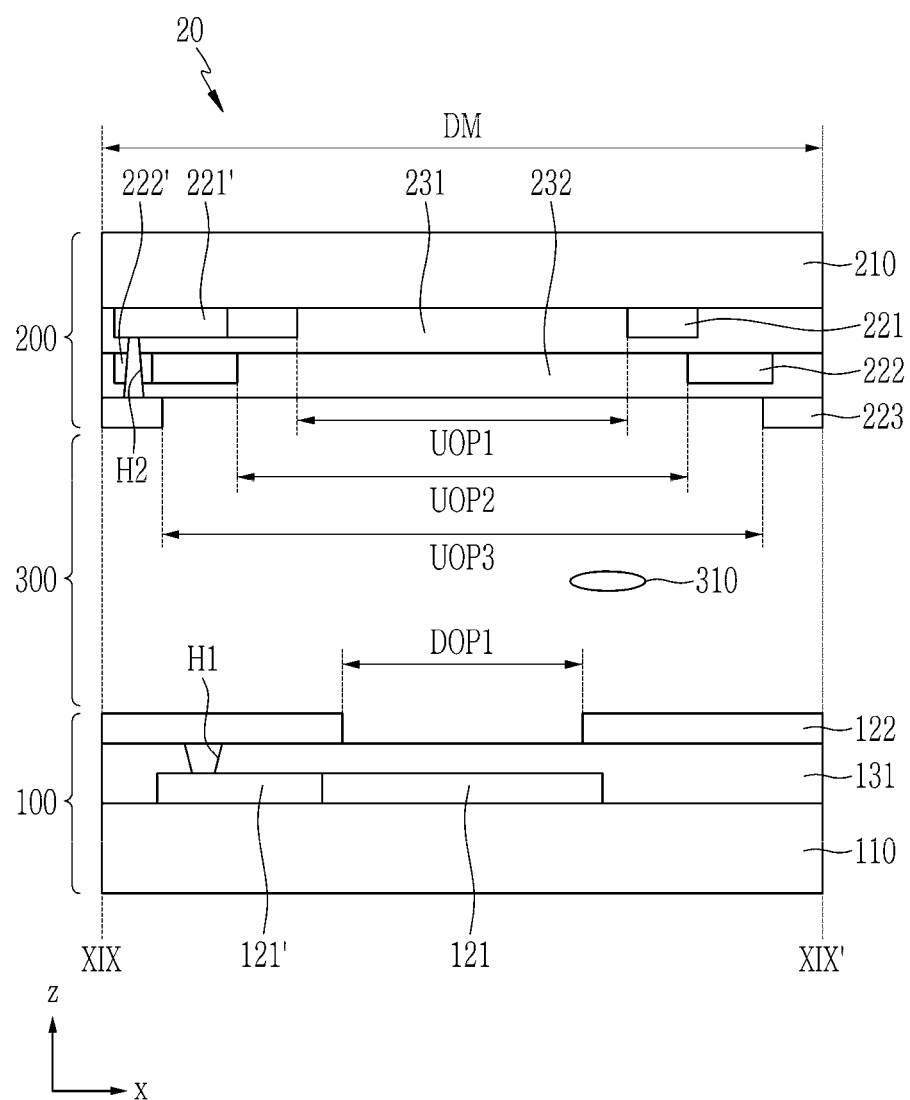
FIG. 19 is a cross-sectional view of a lens panel shown in FIG. 18 taken along a line XIX-XIX'.

FIG. 18 is a plane view of a lens panel according to another exemplary embodiment. FIG. 19 is a cross-sectional view of a lens panel shown in FIG. 18 taken along a line XIX-XIX'.

Referring to FIG. 18 and FIG. 19, in the first electrode unit 100, the third electrode 123 and the second insulating layer 132 are omitted and the first contact hole H1 is positioned at the overlapping position of the first branch unit 121' and the second electrode 122. That is, at the overlapping position of the first branch unit 121' and the second electrode 122, the first insulating layer 131 may have the first contact hole H1, and the first electrode 121 and the second electrode 122 may be connected to each other through the first contact hole H1.

The second electrode unit 200 includes a plurality of corresponding electrodes 221, 222, and 223 positioned at the different layers. The plurality of corresponding electrodes 221, 222, and 223 included in the second electrode unit 200 are electrically connected to each other such that the same voltage may be applied to the plurality of corresponding electrodes 221, 222, and 223.

As a difference from the second electrode unit 200 described in FIG. 16 and FIG. 17, the first corresponding electrode 221 overlaps the second corresponding opening UOP2, but does not overlap the third corresponding electrode 223. Also, the edge of the first corresponding electrode 221 may overlap the second corresponding electrode 222. According to an exemplary embodiment, the edge of the first corresponding electrode 221 may overlap the edge of the second corresponding opening UOP2. A first corresponding branch unit 221' connected to the first corresponding electrode 221 may be positioned at the same layer as the first corresponding electrode 221. The first corresponding branch unit 221' may be formed of the same material as the first corresponding electrode 221. The first corresponding branch unit 221' overlaps the second corresponding electrode 222 and the third corresponding electrode 223. Also, the second corresponding electrode 222 may overlap the third corresponding opening UOP3, and the edge of the second corresponding electrode 222 may overlap the third corresponding electrode 223. According to an exemplary embodiment, the edge of the second corresponding electrode 222 may overlap the edge of the third corresponding opening UOP3. A second corresponding branch unit 222' connected to the second corresponding electrode 222 may be positioned at the same layer as the second corresponding electrode 222. The second corresponding branch unit 222' overlaps the first corresponding branch unit 221' and the third corresponding electrode 223. A second contact hole H2 is positioned at the overlapping position of the first corresponding branch unit 221', the second corresponding branch unit 222', and the third corresponding electrode 223. That is, at the overlapping position of the first corresponding branch unit 221', the second corresponding branch unit 222', and the third corresponding electrode 223, the first corresponding insulating layer 231, the second corresponding branch unit 222', and the second corresponding insulating layer 232 may have the second contact hole H2. The conductive material is filled in the second contact hole H2, and the first corresponding branch unit 221', the second corresponding branch unit 222', and the third corresponding electrode 223 may be electrically connected through the second contact hole H2.

Except for these differences, characteristics of the exemplary embodiments described with reference to FIG. 1 to FIG. 13, and FIG. 16 and FIG. 17, may all be applied to the exemplary embodiment described with reference to FIG. 18 and FIG. 19 such that the description of the characteristics of the exemplary embodiments described in FIG. 1 to FIG. 13, and FIG. 16 and FIG. 17, is omitted.

Figure 20:
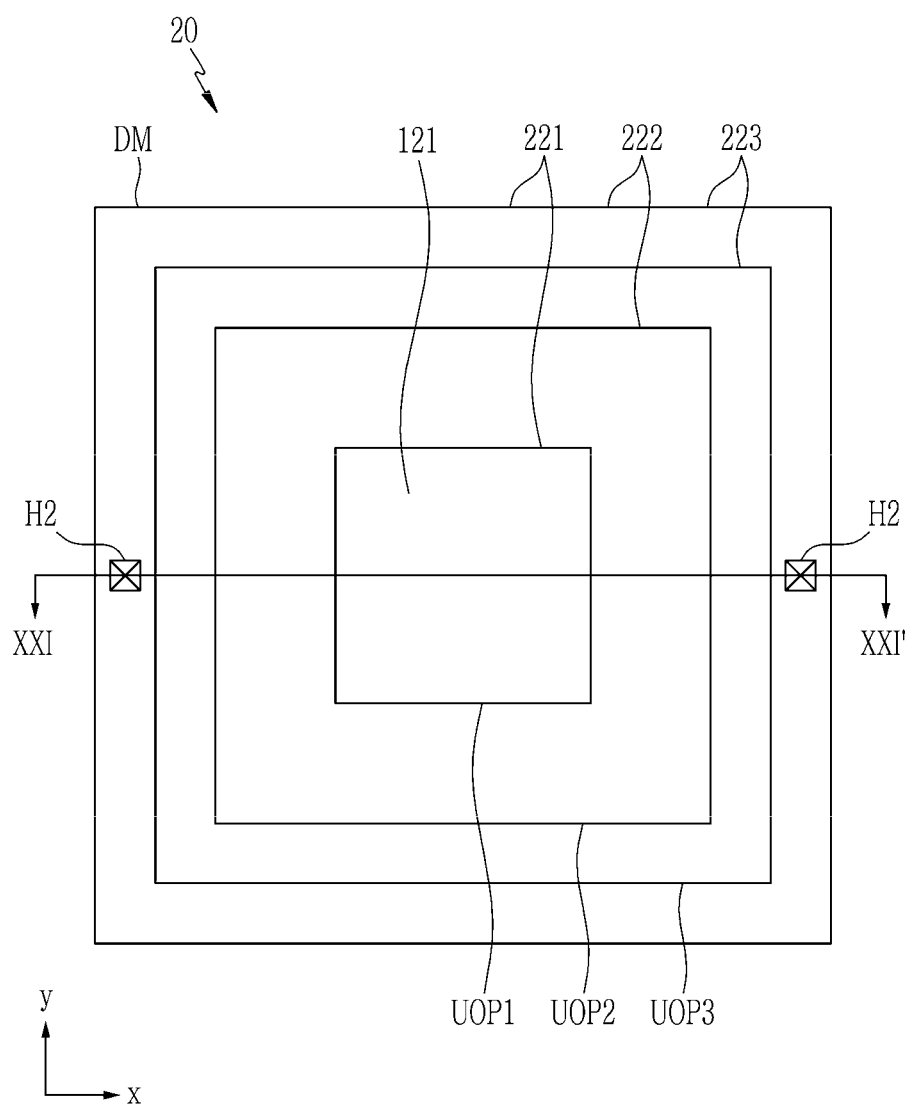
FIG. 20 is a plane view of a lens panel according to another exemplary embodiment.
Figure 21:
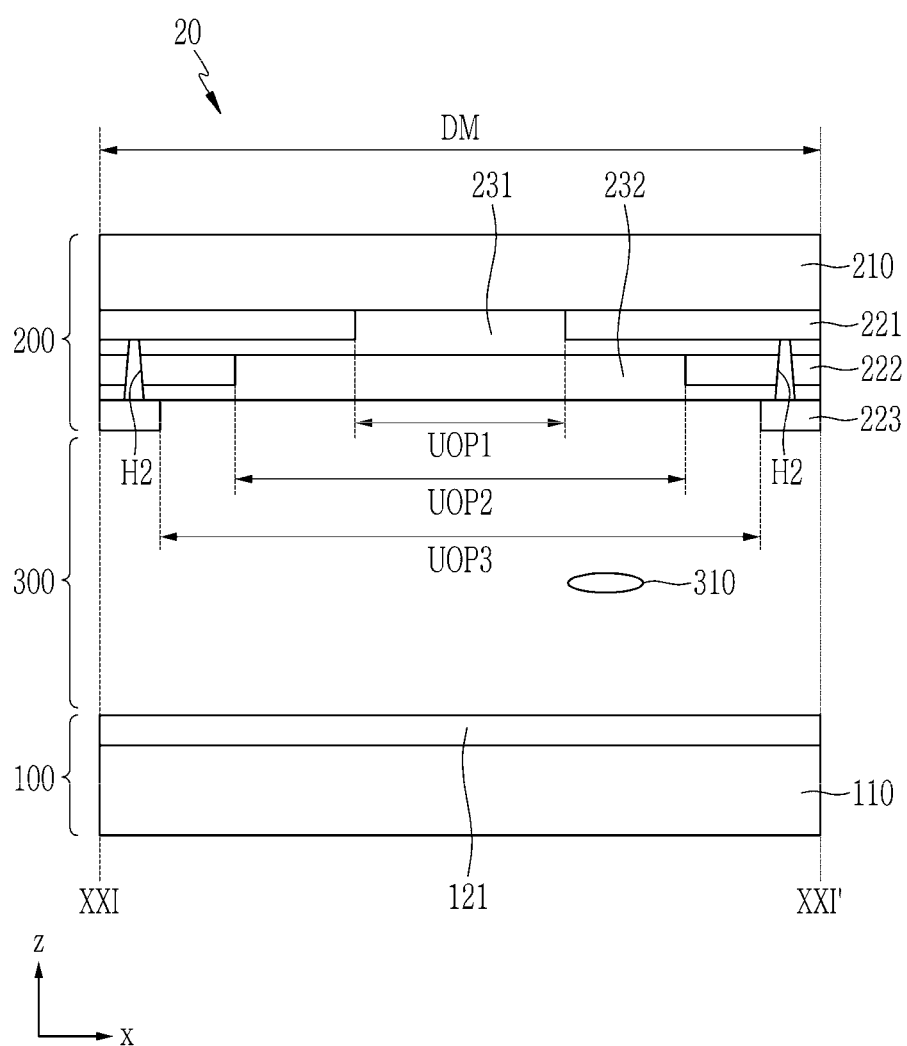
FIG. 21 is a cross-sectional view of a lens panel shown in FIG. 20 taken along a line XXI-XXI'.

FIG. 20 is a plane view of a lens panel according to another exemplary embodiment. FIG. 21 is a cross-sectional view of a lens panel shown in FIG. 20 taken along a line XXI-XXI'.

Referring to FIG. 20 and FIG. 21, the first electrode unit 100 includes the first electrode 121 positioned on the entire surface of the first substrate 110 for one domain DM. That is, the first insulating layer 131, the second electrode 122, the second insulating layer 132, and the third electrode 123 are omitted.

The second electrode unit 200 may be configured the same as described in FIG. 16 and FIG. 17.

Except for these differences, characteristics of the exemplary embodiments described with reference to FIG. 1 to FIG. 13, and FIG. 16 and FIG. 17, may all be applied to the exemplary embodiment described with reference to FIG. 20 and FIG. 21 such that the description of the characteristics of the exemplary embodiments described in FIG. 1 to FIG. 13, and FIG. 16 and FIG. 17, is omitted.

Figure 22:
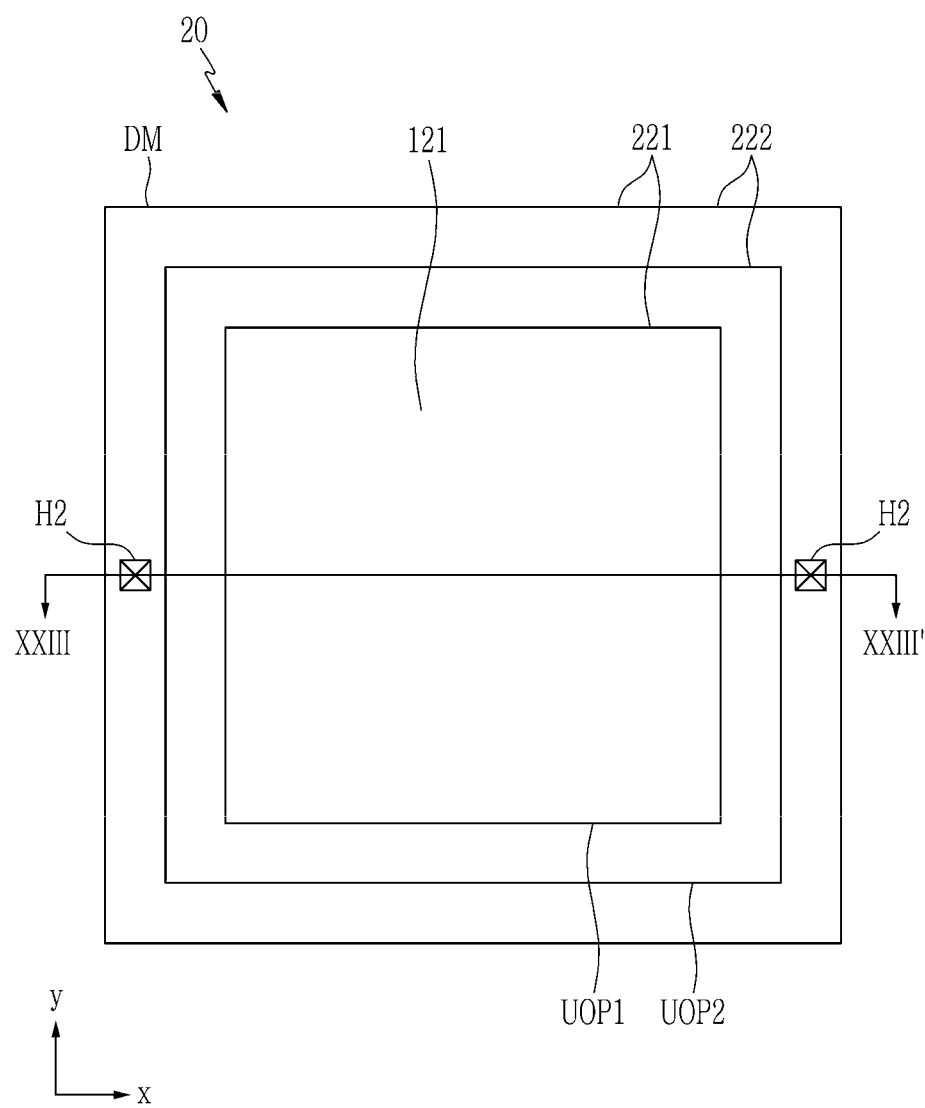
FIG. 22 is a plane view of a lens panel according to another exemplary embodiment.
Figure 23:
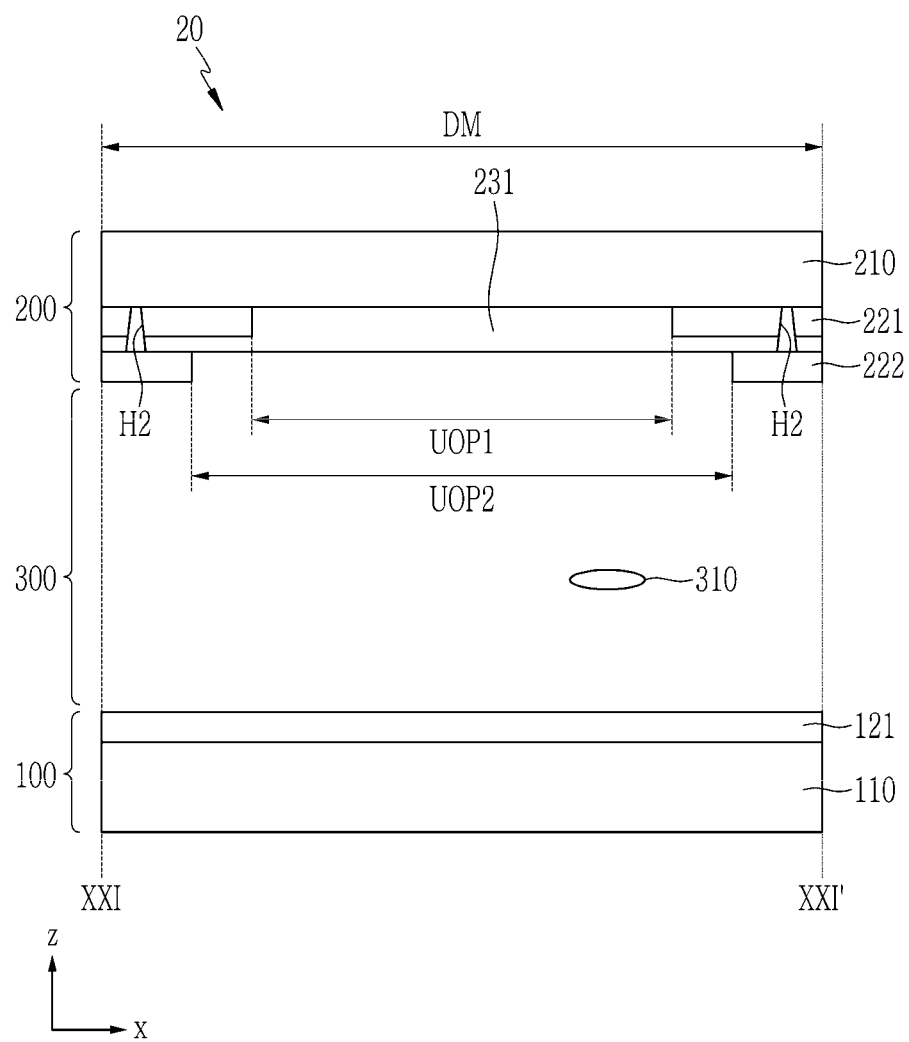
FIG. 23 is a cross-sectional view of a lens panel shown in FIG. 22 taken along a line XXIII-XXIII'.

FIG. 22 is a plane view of a lens panel according to another exemplary embodiment. FIG. 23 is a cross-sectional view of a lens panel shown in FIG. 22 taken along a line XXIII-XXIII'.

Referring to FIG. 22 and FIG. 23, the first electrode unit 100 includes the first electrode 121 positioned on the entire surface of the first substrate 110. That is, the first insulating layer 131, the second electrode 122, the second insulating layer 132, and the third electrode 123 are omitted.

The second electrode unit 200 includes the first corresponding electrode 221 and the second corresponding electrode 222 that are positioned at the different layers. The first corresponding electrode 221 may be positioned on the second substrate 210 and may have the first corresponding opening UOP1. The first corresponding insulating layer 231 is positioned on the first corresponding electrode 221 and the second substrate 210. The second corresponding electrode 222 is positioned on the first corresponding insulating layer 231. The second corresponding electrode 222 may have the second corresponding opening UOP2. The region of the second corresponding opening UOP2 may be wider than the region of the first corresponding opening UOP1, and the region of the first corresponding opening UOP1 may be included in the region of the second corresponding opening UOP2. That is, the first corresponding opening UOP1 may overlap the second corresponding opening UOP2. The second contact hole H2 is positioned at the overlapping position of the first corresponding electrode 221 and the second corresponding electrode 222. That is, at the overlapping position of the first corresponding electrode 221 and the second corresponding electrode 222, the first corresponding insulating layer 231 may have the second contact hole H2. The conductive material is filled in the second contact hole H2, and the first corresponding electrode 221 and the second corresponding electrode 222 may be electrically connected to each other through the second contact hole H2. One of the first corresponding opening UOP1 of the first corresponding electrode 221 and the second corresponding opening UOP2 of the second corresponding electrode 222 may be omitted. That is, the first corresponding electrode 221 may be positioned on the entire surface of the second substrate 210 for one domain DM, or the second corresponding electrode 222 may be positioned on the entire surface of the first corresponding insulating layer 231 for one domain DM.

Except for these differences, characteristics of the exemplary embodiment described with reference to FIG. 1 to FIG. 13 may all be applied to the exemplary embodiment described with reference to FIG. 22 and FIG. 23 such that the description of the characteristics of the exemplary embodiment described in FIG. 1 to FIG. 13 is omitted.

Figure 24:
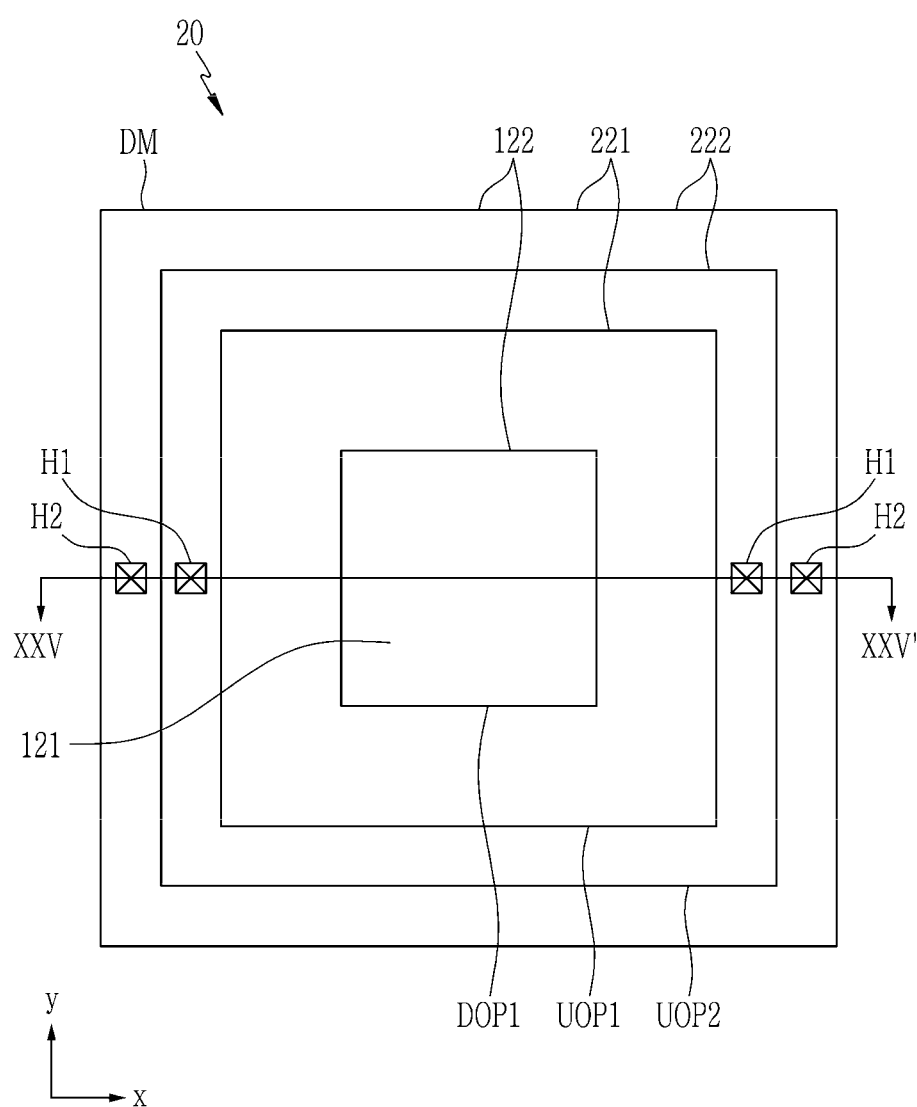
FIG. 24 is a plane view of a lens panel according to another exemplary embodiment.
Figure 25:
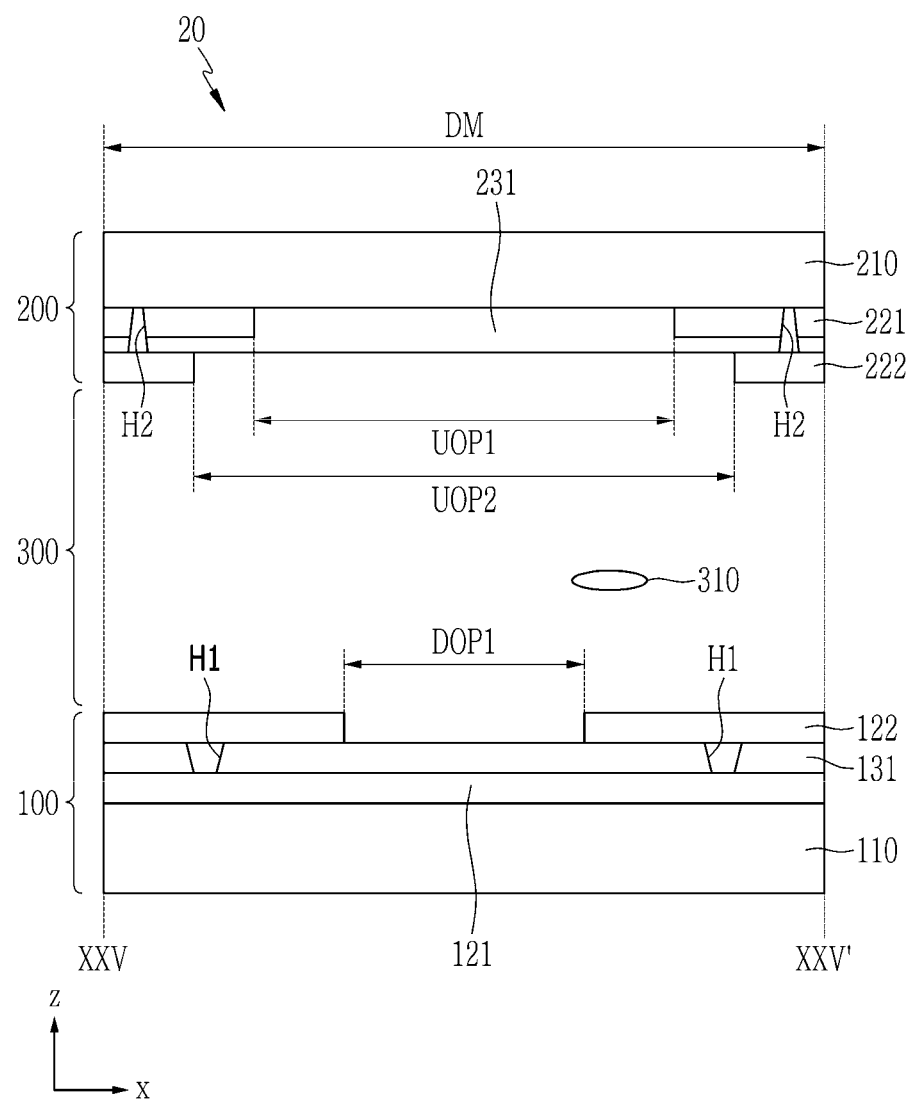
FIG. 25 is a cross-sectional view of a lens panel shown in FIG. 24 taken along a line XXV-XXV'.

FIG. 24 is a plane view of a lens panel according to another exemplary embodiment. FIG. 25 is a cross-sectional view of a lens panel shown in FIG. 24 taken along a line XXV-XXV.

Referring to FIG. 24 and FIG. 25, the first electrode unit 100 includes the first electrode 121 and the second electrode 122. That is, the second insulating layer 132 and the third electrode 123 are omitted.

The first electrode 121 is positioned on the entire surface of the first substrate 110 for one domain DM. The first insulating layer 131 is positioned on the first electrode 121. The second electrode 122 is positioned on the first insulating layer 131. The second electrode 122 has the first opening DOP1 and overlaps the first electrode 121. At the overlapping position of the first electrode 121 and the second electrode 122, the first insulating layer 131 has the first contact hole H1. The first contact hole H1 is filled with the conductive material, and the first electrode 121 and the second electrode 122 may be electrically connected to each other through the first contact hole H1.

The second electrode unit 200 may be configured the same as described in FIG. 22 and FIG. 23.

Except for these differences, characteristics of the exemplary embodiments described with reference to FIG. 1 to FIG. 13, and FIG. 22 and FIG. 23, may all be applied to the exemplary embodiment described with reference to FIG. 24 and FIG. 25 such that the description of the characteristics of the exemplary embodiment described in FIG. 1 to FIG. 13, and FIG. 22 and FIG. 23, is omitted.

Figure 26:
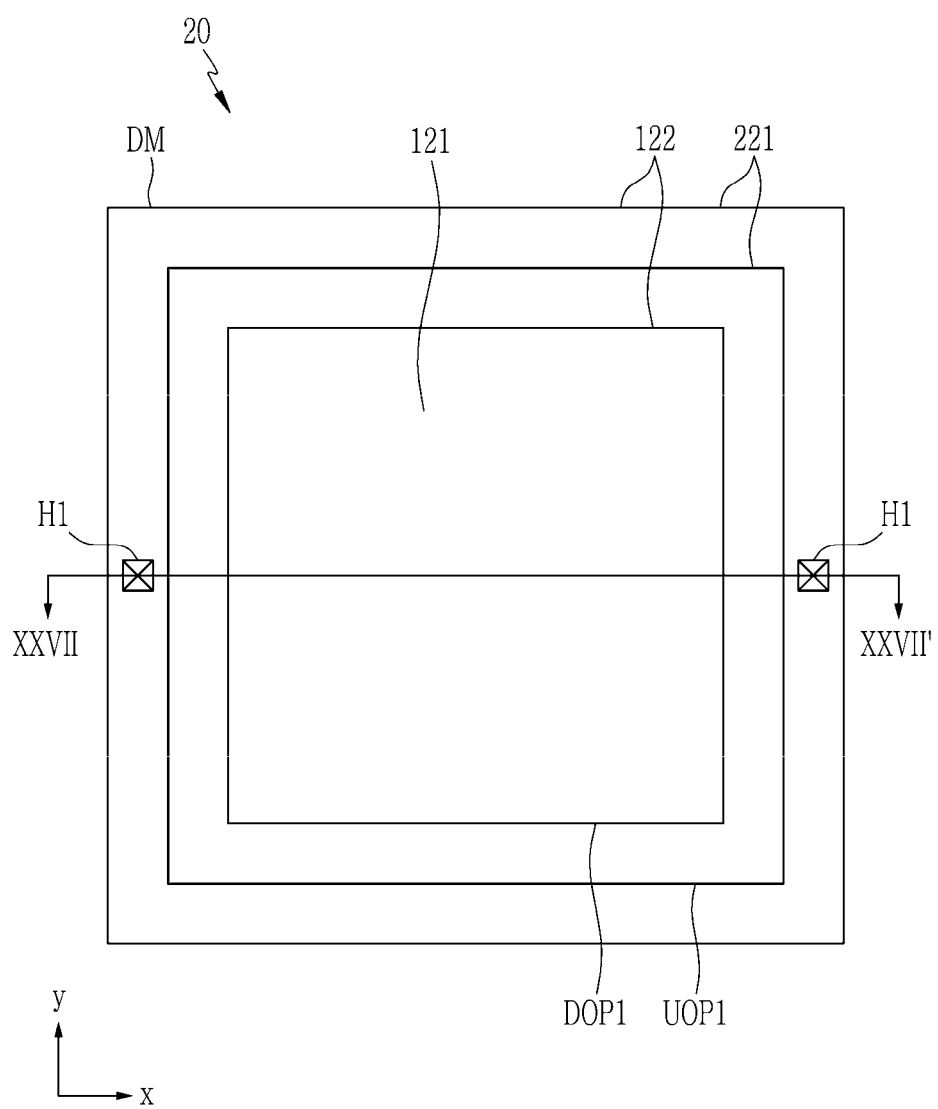
FIG. 26 is a plane view of a lens panel according to another exemplary embodiment.
Figure 27:
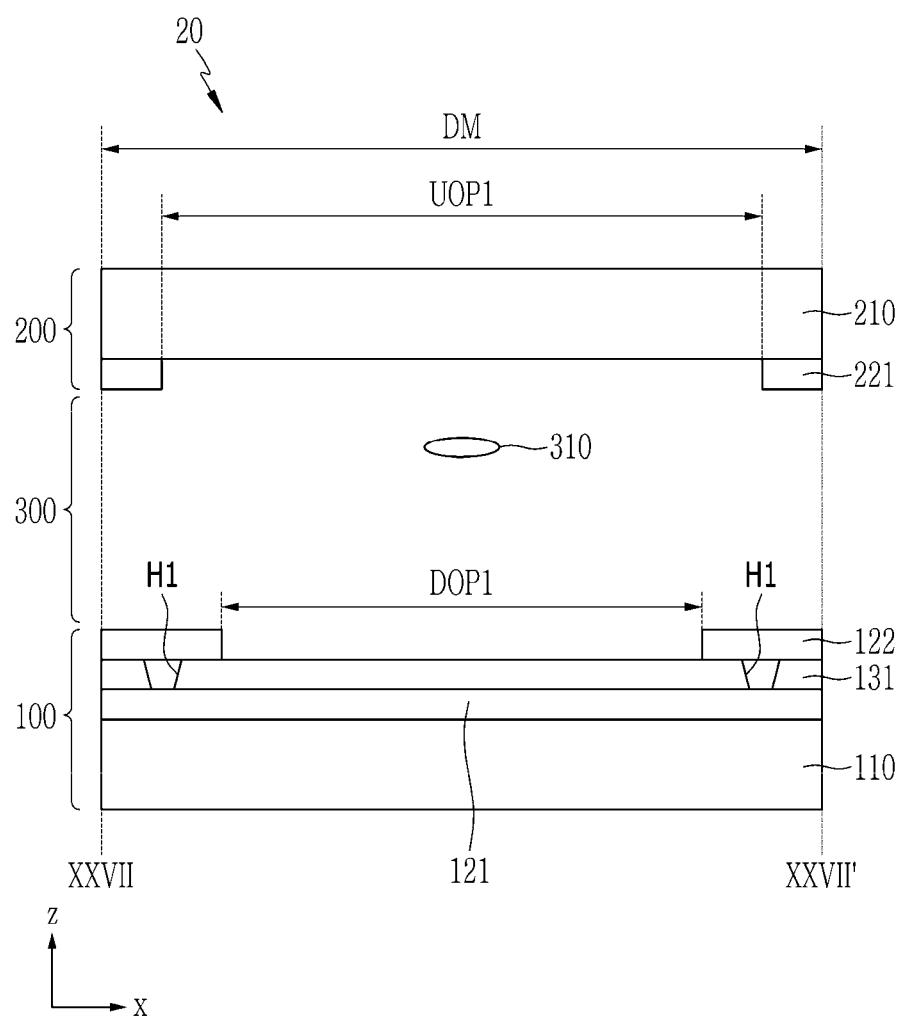
FIG. 27 is a cross-sectional view of a lens panel shown in FIG. 26 taken along a line XXVII-XXVII'.

FIG. 26 is a plane view of a lens panel according to another exemplary embodiment. FIG. 27 is a cross-sectional view of a lens panel shown in FIG. 26 taken along a line XXVII-XXVII'.

Referring to FIG. 26 and FIG. 27, the first electrode unit 100 may be configured the same as described in FIG. 24 and FIG. 25.

Except for the first electrode unit 100 configured the same as described in FIG. 24 and FIG. 25, characteristics of the exemplary embodiment described with reference to FIG. 1 to FIG. 13, and FIG. 24 and FIG. 25, may all be applied to the exemplary embodiment described with reference to FIG. 26 and FIG. 27 such that the description of the characteristics of the exemplary embodiment described in FIG. 1 to FIG. 13, and FIG. 26 and FIG. 27, is omitted.

Figure 28:
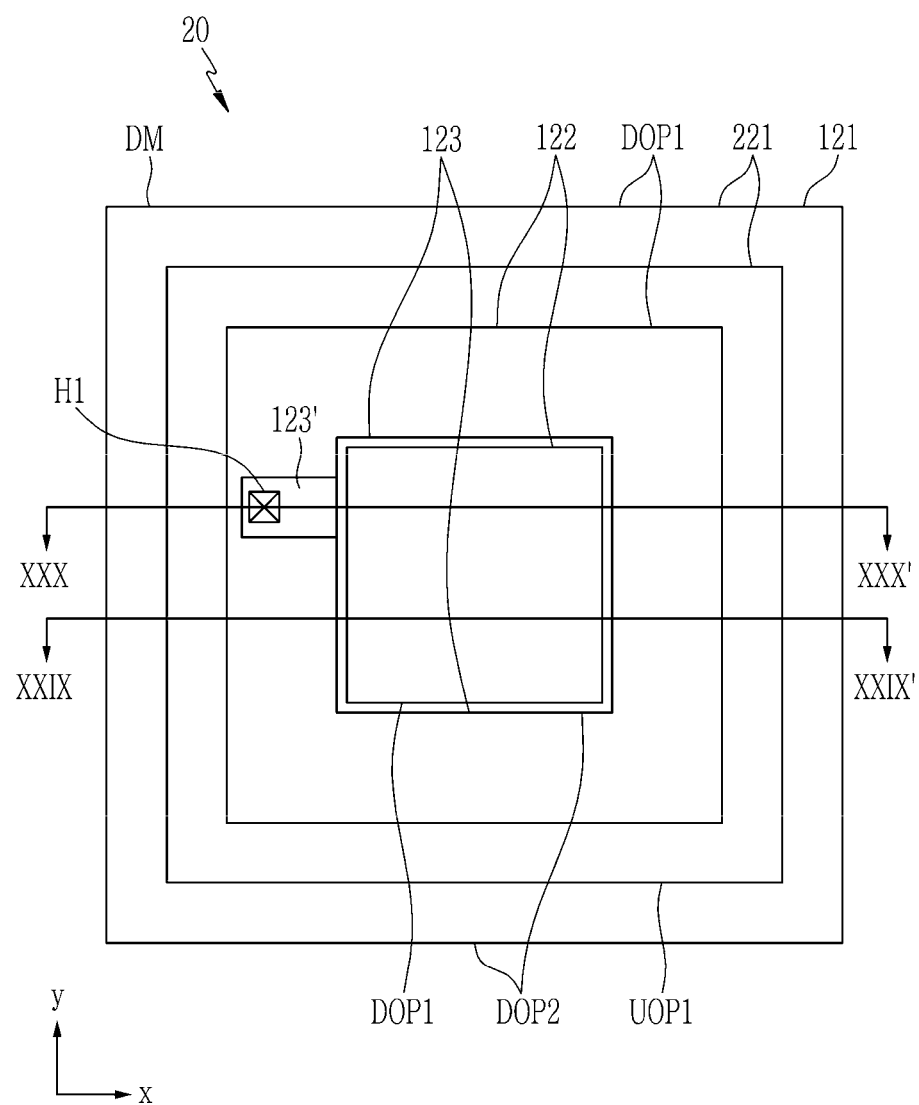
FIG. 28 is a plane view of a lens panel according to another exemplary embodiment.
Figure 29:
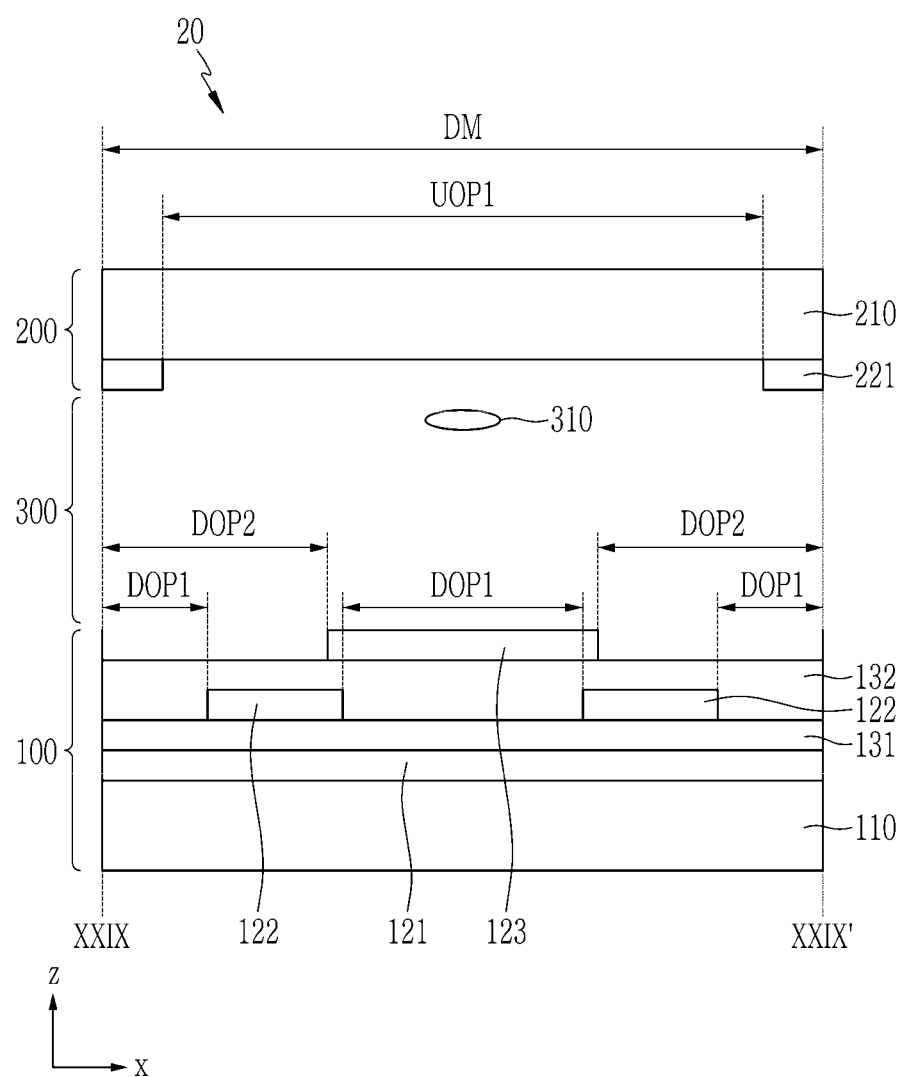
FIG. 29 is a cross-sectional view of a lens panel shown in FIG. 28 taken along a line XXIX-XXIX'.
Figure 30:
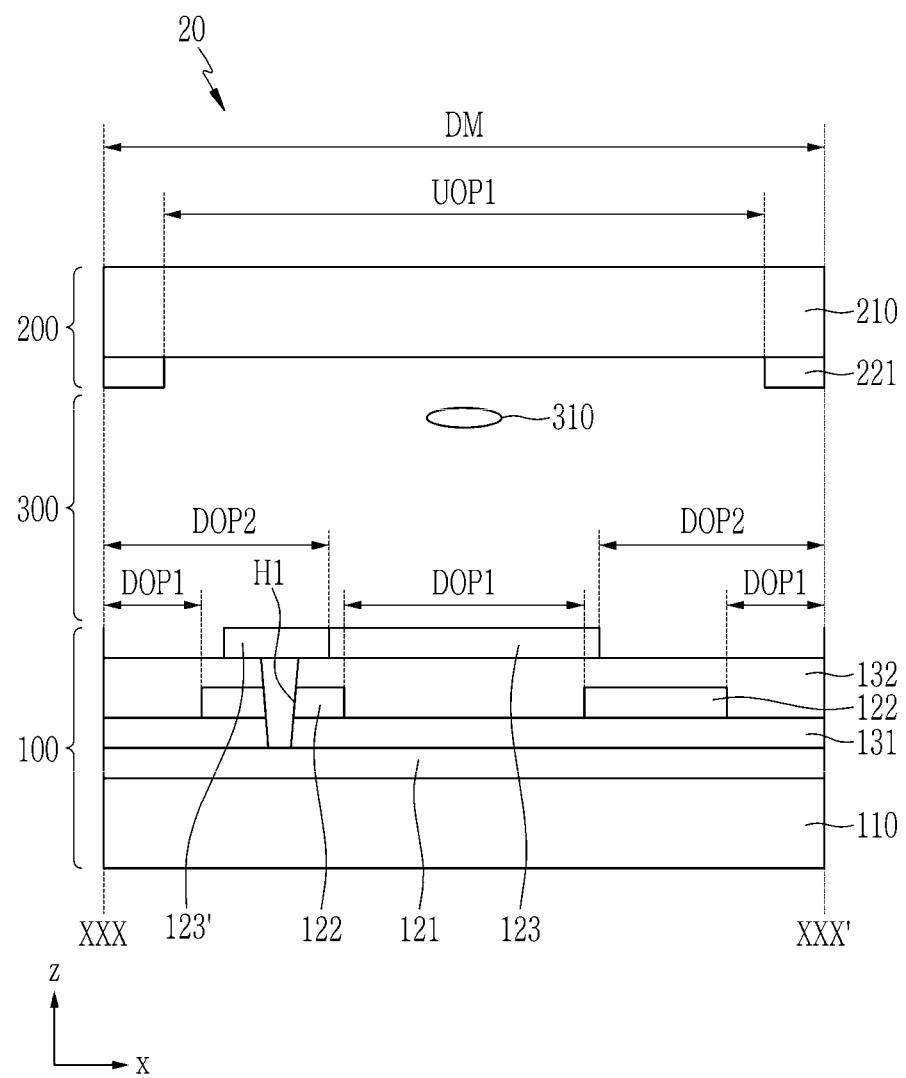
FIG. 30 is a cross-sectional view of a lens panel shown in FIG. 28 taken along a line XXX-XXX'.

FIG. 28 is a plane view of a lens panel according to another exemplary embodiment. FIG. 29 is a cross-sectional view of a lens panel shown in FIG. 28 taken along a line XXIX-XXIX'. FIG. 30 is a cross-sectional view of a lens panel shown in FIG. 28 taken along a line XXX-XXX'.

Referring to FIG. 28 to FIG. 30, the first electrode unit 100 may include the first electrode 121, the second electrode 122, and the third electrode 123.

The first electrode 121 may be positioned on the entire surface of the first substrate 110 for one domain DM. The first insulating layer 131 is positioned on the first electrode 121, and the second electrode 122 is positioned on the first insulating layer 131.

The second electrode 122 has the first opening DOP1. The first opening DOP1 may be positioned at the edge region and the center of the domain DM. That is, the second electrode 122 may have a loop shape of which the center and the edge region of the second electrode 122 are removed for one domain DM. According to an exemplary embodiment, the first opening DOP1 of the second electrode 122 is not positioned at the center of the domain DM and may only be positioned at the edge region of the domain DM. The second insulating layer 132 is positioned on the second electrode 122 and the first insulating layer 131, and the third electrode 123 is positioned on the second insulating layer 132.

The third electrode 123 may be positioned at the approximate center of the domain DM. The third electrode 123 may have the second opening DOP2, and the second opening DOP2 may be positioned at the edge region of the domain DM. The second opening DOP2 may be wider than the first opening DOP1 of the second electrode 122 positioned at the edge region of the domain DM. The second opening DOP2 overlaps the first opening DOP1 of the second electrode 122 positioned at the edge region of the domain DM, but the second opening DOP2 may not overlap the first opening DOP1 of the second electrode 122 positioned at the center of the domain DM. Also, the third electrode 123 overlaps the first opening DOP1 of the second electrode 122 positioned at the center of the domain DM, but may not overlap the first opening DOP1 of the second electrode 122 positioned at the edge region of the domain DM. The third electrode 123 may have a wider area than the first opening DOP1 of the second electrode 122 positioned at the center of the domain DM. That is, the edge of the third electrode 123 may overlap the second electrode 122. According to an exemplary embodiment, the third electrode 123 may have the same area as the first opening DOP1 of the second electrode 122 positioned at the center of the domain DM, and the edge of the third electrode 123 may overlap the edge of the first opening DOP1 of the second electrode 122 positioned at the center of the domain DM.

To electrically connect the first electrode 121, the second electrode 122, and the third electrode 123 to each other, a third branch unit 123' adjacent to the third electrode 123 may be positioned at the same layer as the third electrode 123. The third branch unit 123' may be physically and electrically connected to the third electrode 123. The third branch unit 123' may be formed of the same material as the third electrode 123. The third branch unit 123' overlaps the first electrode 121 and the second electrode 122.

The first contact hole H1 is positioned at the overlapping position of the third branch unit 123', the first electrode 121, and the second electrode 122. That is, at the overlapping position of the third branch unit 123', the first electrode 121, and the second electrode 122, the first insulating layer 131, the second electrode 122, and the second insulating layer 132 have the first contact hole H1. The first contact hole H1 is filled with the conductive material, and the first electrode 121, the second electrode 122, and the third electrode 123 may be electrically connected to each other through the first contact hole H1. The first contact hole H1 may be filled with the same material as the third electrode 123 when forming the third electrode 123.

Except for these differences, characteristics of the exemplary embodiment described with reference to FIG. 1 to FIG. 13 may all be applied to the exemplary embodiment described with reference to FIG. 28 to FIG. 30 such that the description of the characteristics of the exemplary embodiment described in FIG. 1 to FIG. 13 is omitted.

Until now, the exemplary embodiments in which at least one electrode is included in the first electrode unit 100 and at least one electrode is included in the second electrode unit 200 were described. The configuration of the first electrode unit 100 and the configuration of the second electrode unit 200 described in these exemplary embodiments may be variously combined, and configuration of the lens panel 20 through combinations of the first electrode unit 100 and the second electrode unit 200, although not provided in the above-described exemplary embodiments, may be self-evident to those skilled in the art.

Next, the lens panel 20 according to another exemplary embodiment will be described with reference to FIG. 31 to FIG. 36. Differences will be mainly described in comparison with the lens panel 20 according to the exemplary embodiment described in FIG. 1 to FIG. 13.

Figure 31:
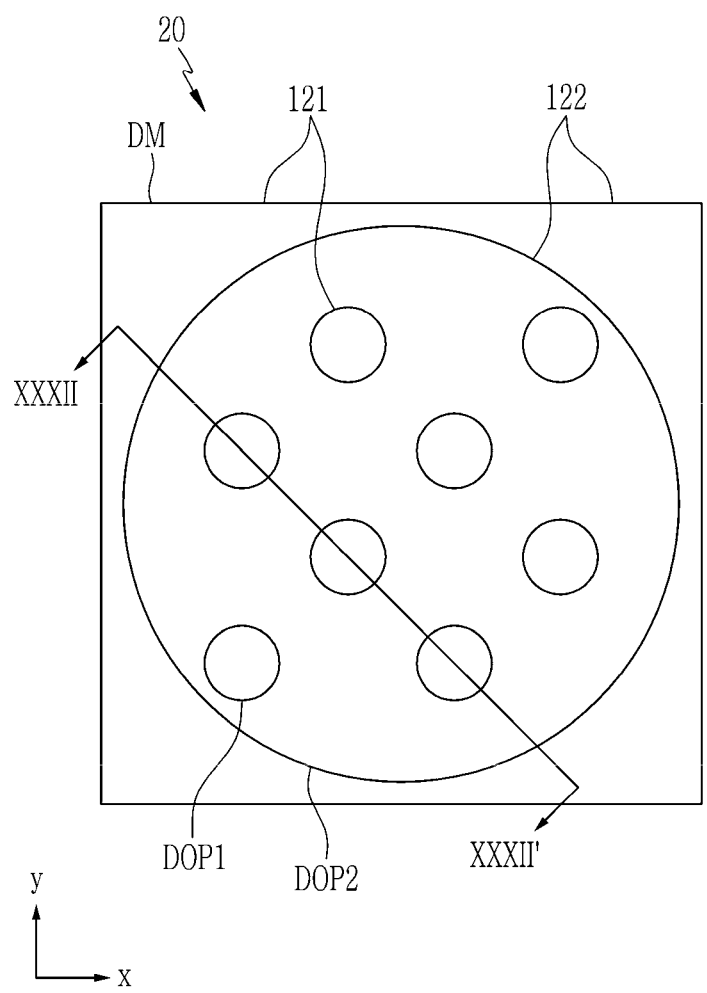
FIG. 31 is a plane view of a lens panel according to another exemplary embodiment.
Figure 32:
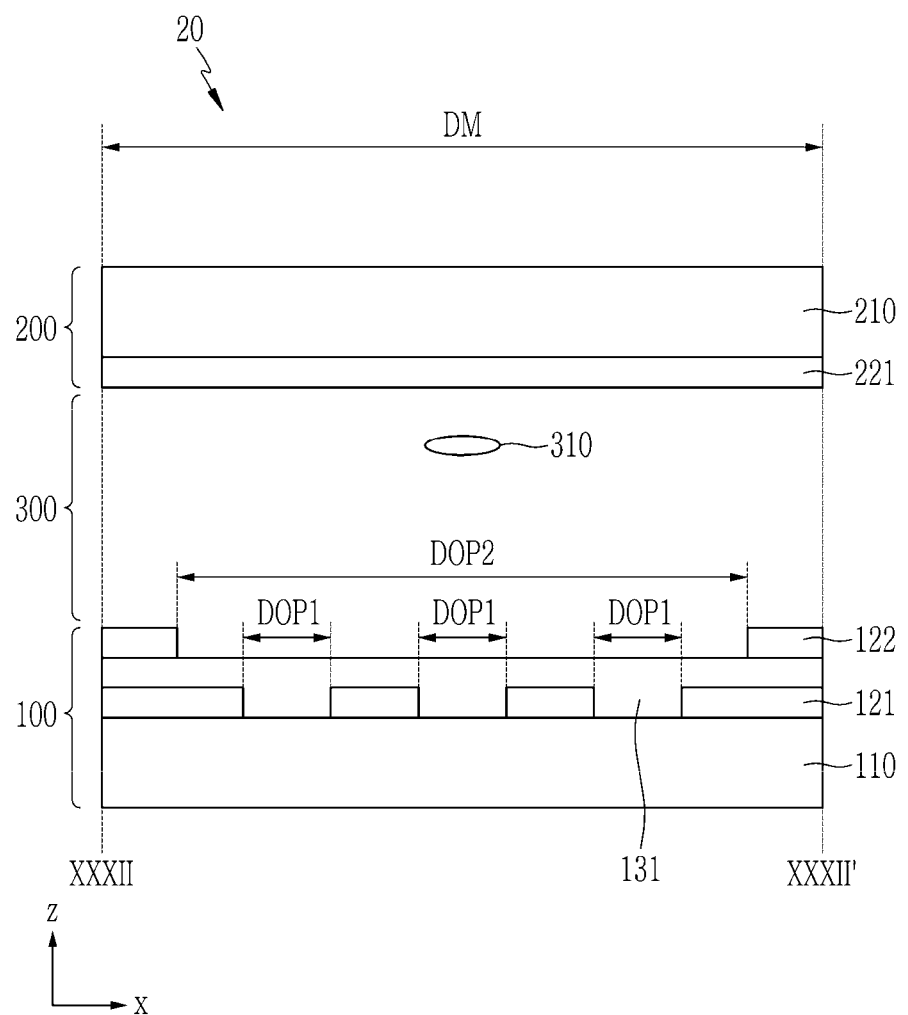
FIG. 32 is a cross-sectional view of a lens panel shown in FIG. 31 taken along a line XXXII'-XXXII'.
Figure 33:
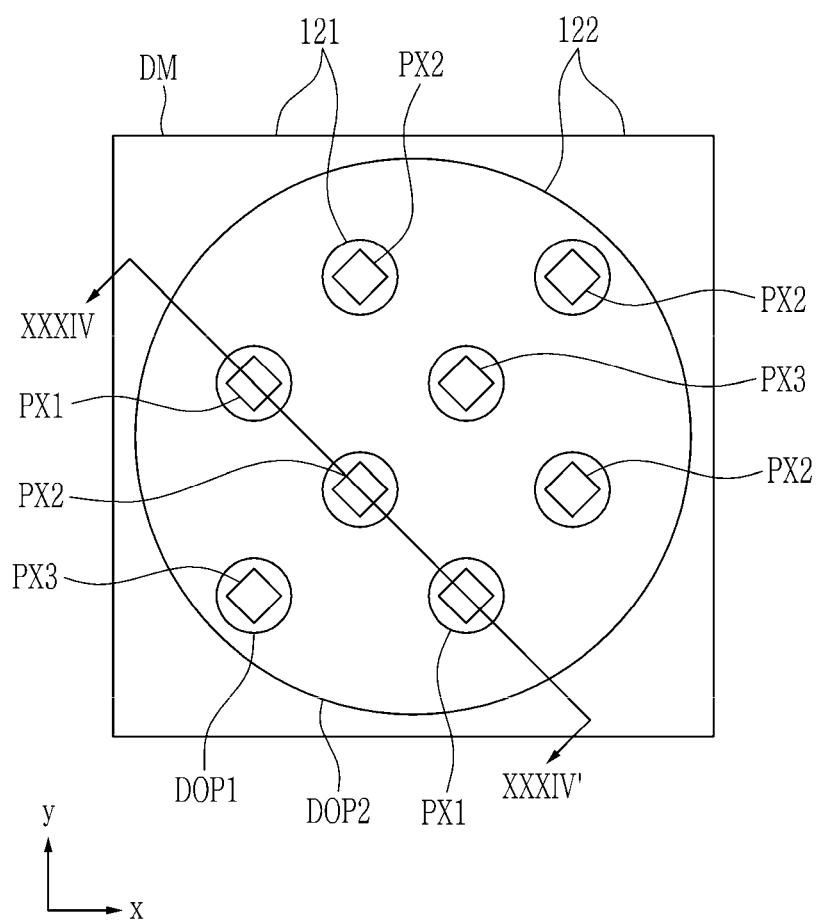
FIG. 33 is a view showing a structure in which a lens panel shown in FIG. 31 is matched with a pixel of a display panel.
Figure 34:
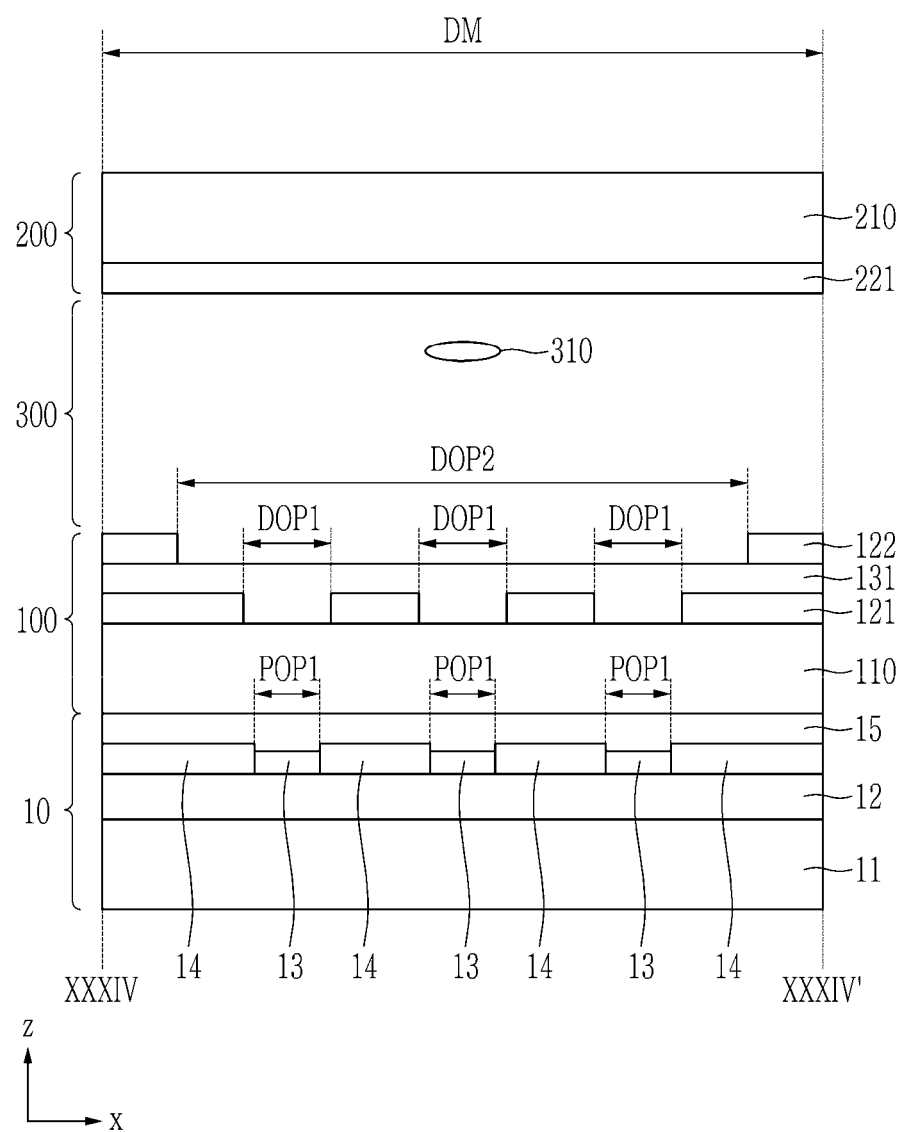
FIG. 34 is a cross-sectional view taken along a line XXXIV-XXXIV' of FIG. 33.
Figure 35:
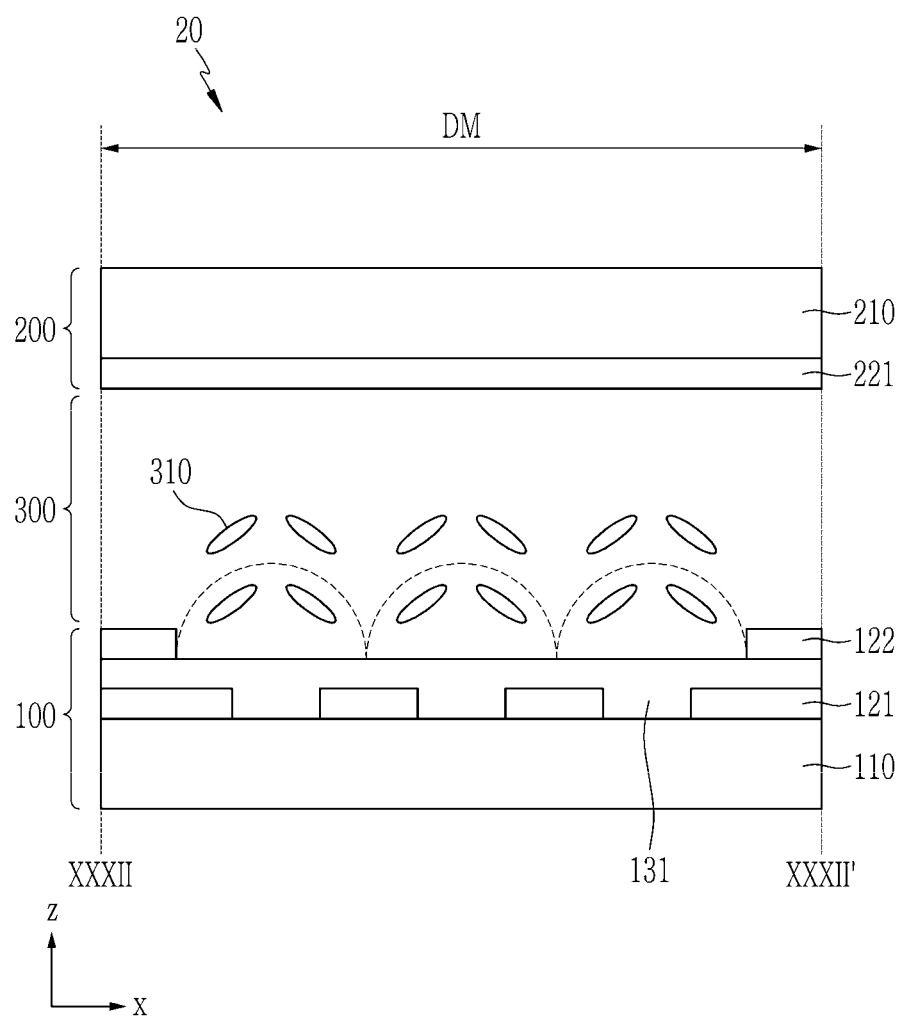
FIG. 35 is a view showing a method in which a lens panel shown in FIG. 31 is operated with a first mode.
Figure 36:
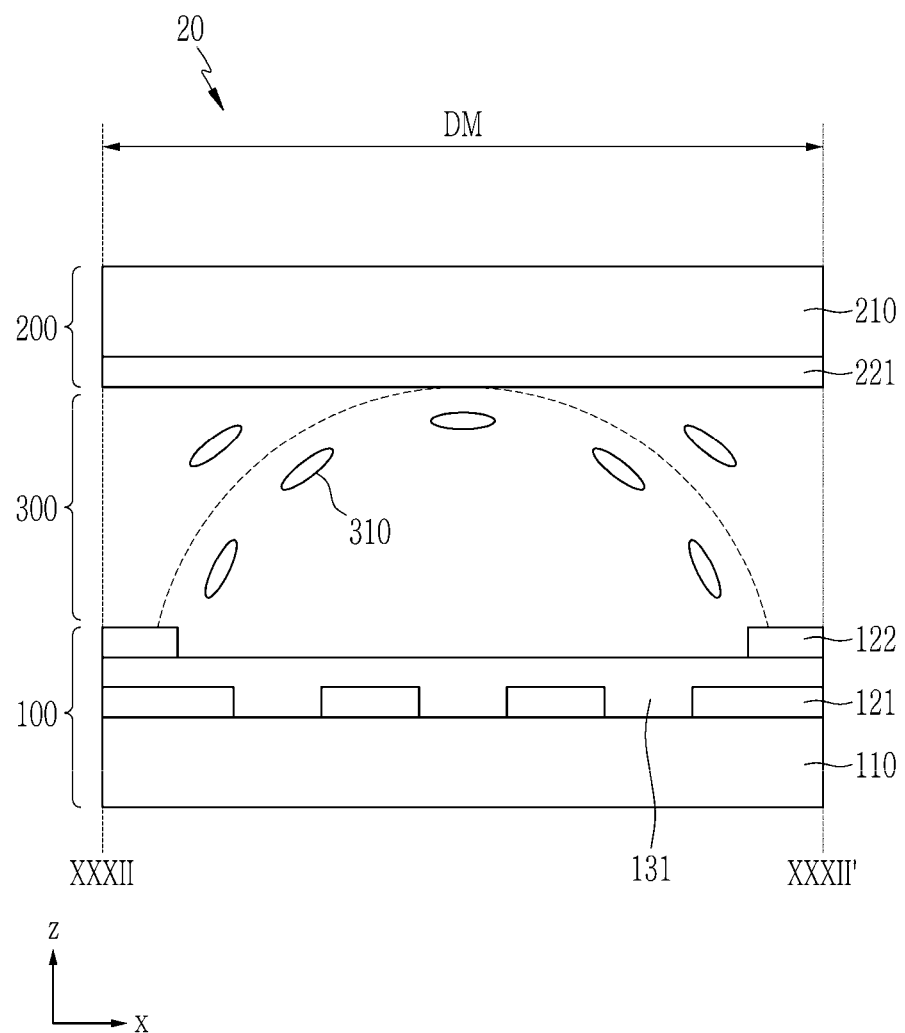
FIG. 36 is a view showing a method in which a lens panel shown in FIG. 31 is operated with a second mode.

FIG. 31 is a plane view of a lens panel according to another exemplary embodiment. FIG. 32 is a cross-sectional view of a lens panel shown in FIG. 31 taken along a line XXXII-XXXII', and FIG. 33 is a view showing a structure in which a lens panel shown in FIG. 31 is matched with a pixel of a display panel. FIG. 34 is a cross-sectional view taken along a line XXXIV-XXXIV' of FIG. 33. FIG. 35 is a view showing a method in which a lens panel shown in FIG. 31 is operated with a first mode. FIG. 36 is a view showing a method in which a lens panel shown in FIG. 31 is operated with a second mode.

Referring to FIG. 31 to FIG. 36, the lens panel 20 includes the first electrode unit 100, the second electrode unit 200, and the photomodulation unit 300.

The first electrode unit 100 includes the first electrode 121 and the second electrode 122. The first insulating layer 131 is positioned between the first electrode 121 and the second electrode 122, and the first electrode 121 and the second electrode 122 may be insulated from each other by the first insulating layer 131.

In one domain DM, the first electrode 121 has a plurality of first openings DOP1. Each of the plurality of first openings DOP1 may overlap at least one of the pixels PX1, PX2, and PX3. Each shape of the plurality of first openings DOP1 may be circular, however it is not limited thereto. The plurality of first openings DOP1 may be arranged at the positions corresponding to the plurality of pixels PX1, PX2, and PX3 included in the display panel 10. The plurality of pixels PX1, PX2, and PX3 may include a red pixel PX1, a green pixel PX2, and a blue pixel PX3. The plurality of pixels PX1, PX2, and PX3 included in the display panel 10 may be arranged in various ways as is well known, so the present inventive concept is not limited thereto.

As shown in FIG. 34, the display panel 10 may include a base substrate 11, a driving layer 12, a plurality of light-emitting elements 13, a pixel protection layer 14, and an encapsulation layer 15. The driving layer 12 is positioned on the base substrate 11, and the driving layer 12 may include a plurality of wires (not shown) and a plurality of transistors (not shown) to drive the plurality of pixels PX1, PX2, and PX3. The plurality of light-emitting elements 13 and the pixel protection layer 14 are positioned on the driving layer 12. The plurality of light-emitting elements 13 receive a data voltage through the driving layer 12, thereby being emitted with a luminance corresponding to the data voltage. The plurality of light-emitting elements 13 may include an organic light emitting element or an inorganic light-emitting element. The pixel protection layer 14 has a function of dividing boundaries between the plurality of light-emitting elements 13 and preventing a short between the light-emitting elements 13. Also, the pixel protection layer 14 is positioned to enclose the plurality of light-emitting elements 13 on a plane, thereby defining the region of the light-emitting elements 13. The region defined by the pixel protection layer 14 may be the region of the pixels PX1, PX2, and PX3. That is, the pixel protection layer 14 may have a plurality of pixel openings POP1 corresponding to the regions of the plurality of light-emitting elements 13. The plurality of pixel openings POP1 may overlap the plurality of first openings DOP1. The plurality of first openings DOP1 may have a wider area than the plurality of pixel openings POP1. On the other hand, while FIG. 34 shows an example in which the first electrode unit 100 includes the first substrate 110, the first substrate 110 may be omitted, and the first electrode 121 may be positioned on the encapsulation layer 15 of the display panel 10 according to an exemplary embodiment.

The second electrode 122 has the second opening DOP2. The second opening DOP2 overlaps the plurality of first openings DOP1. That is, the second opening DOP2 may have a region that may overlap all of the plurality of first openings DOP1 included in one domain DM. The shape of the second opening DOP2 may be circular, however it is not limited thereto.

The second electrode unit 200 includes the first corresponding electrode 221 positioned on the entire surface of the second substrate 210. That is, the first corresponding electrode 221 may overlap the entire surface of the second electrode unit 200. Also, the first corresponding electrode 221 may overlap the second opening DOP2 and the plurality of first openings DOP1.

As shown in FIG. 35, in the first mode to display the 2D image, the different voltages are applied to the first electrode 121 and the first corresponding electrode 221, and a voltage difference is generated between the first electrode 121 and the first corresponding electrode 221. In this case, the voltage is not applied to the second electrode 122. As the voltage difference is generated between the first electrode 121 and the first corresponding electrode 221, the liquid crystal molecules 310 are rearranged by the electric field between the first electrode 121 and the first corresponding electrode 221 around each edge of the plurality of first openings DOP1. The light transmitted through the lens panel 20 may proceed into a side surface forming a predetermined angle by a front surface as well as the front surface by the liquid crystal molecules 310 rearranged corresponding to the plurality of first openings DOP1 of the first electrode 121.

Accordingly, in the first mode displaying the 2D image, lateral visibility of the display device may be improved.

As shown in FIG. 36, in the second mode to display the 3D image, the different voltages are applied to the second electrode 122 and the first corresponding electrode 221, and the voltage difference is generated between the second electrode 122 and the first corresponding electrode 221. In this case, the voltage is not applied to the first electrode 121. As the voltage difference is generated between the second electrode 122 and the first corresponding electrode 221, the liquid crystal molecules 310 are rearranged by the electric field between the second electrode 122 and the first corresponding electrode 221 between the edges of the second openings DOP2, thereby forming the lens ML.

Next, the lens panel 20 according to another exemplary embodiment will be described with reference to FIG. 37 and FIG. 38. Differences will be mainly described compared with the lens panel 20 according to the exemplary embodiment described in FIG. 31 to FIG. 36.

Figure 37:
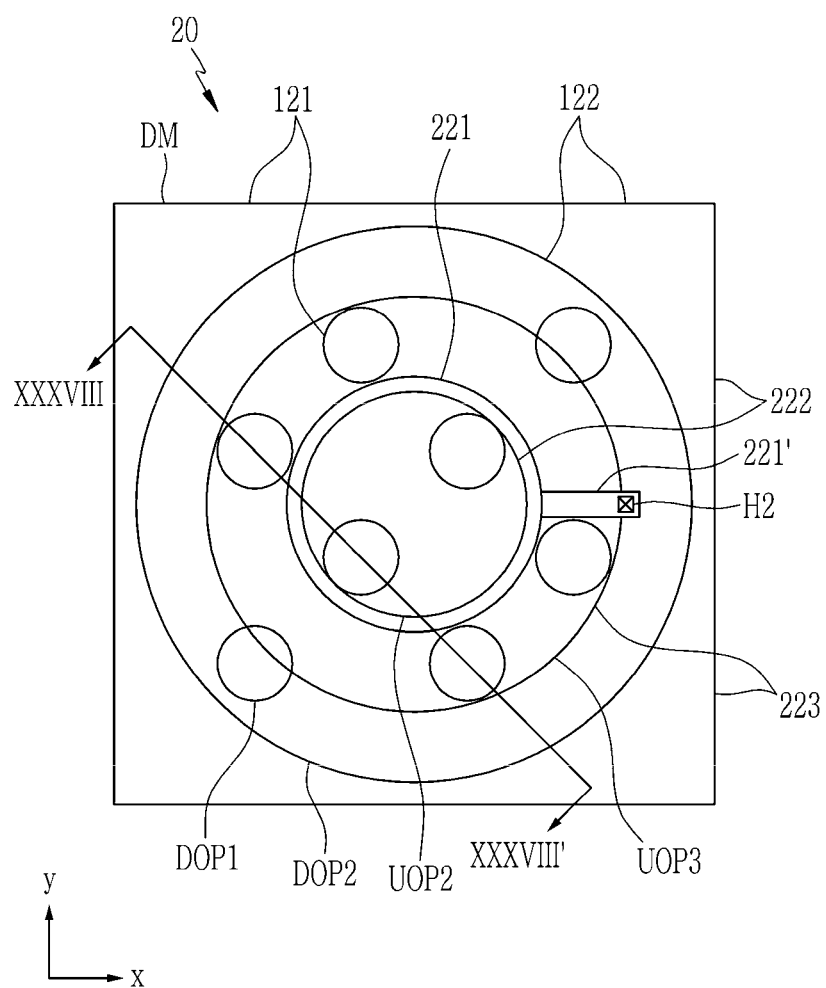
FIG. 37 is a plane view of a lens panel according to another exemplary embodiment.

FIG. 37 is a plane view of a lens panel according to another exemplary embodiment. FIG. 38 is a cross-sectional view of a lens panel shown in FIG. 37 taken along a line XXXVIII-XXXVIII'.

Figure 38:
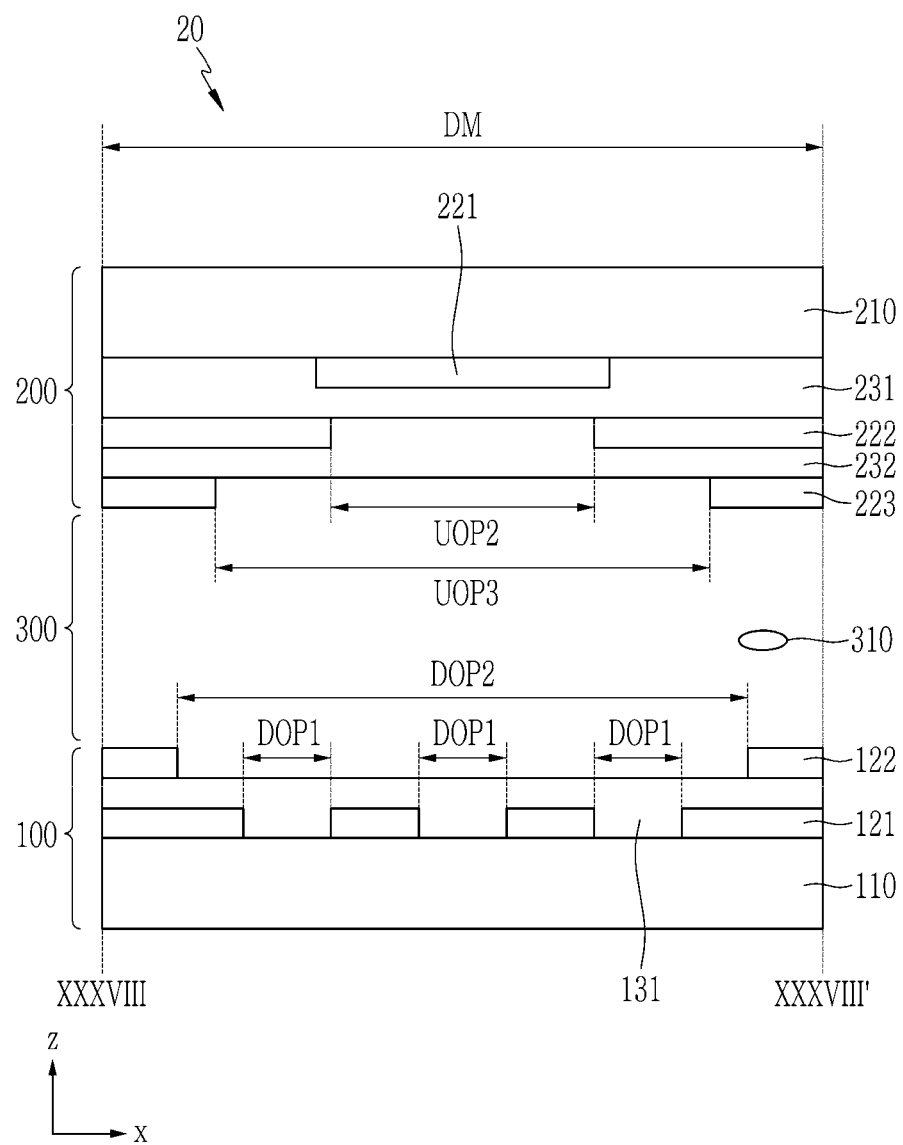
FIG. 38 is a cross-sectional view of a lens panel shown in FIG. 37 taken along a line XXXVIII-XXXVIII'.

Referring to FIG. 37 and FIG. 38, as the difference from the lens panel 20 according to the exemplary embodiment described in FIG. 31 to FIG. 36, the second electrode unit 200 includes a plurality of corresponding electrodes 221, 222, and 223 that are positioned at the different layers.

The second electrode unit 200 may include a first corresponding electrode 221, a second corresponding electrode 222, and a third corresponding electrode 223. The first corresponding electrode 221 may be positioned on the second substrate 210.

The first corresponding electrode 221 may be positioned at the approximate center of the domain DM. The first corresponding insulating layer 231 is positioned on the first corresponding electrode 221 and the second substrate 210. The second corresponding electrode 222 is positioned on the first corresponding insulating layer 231. The second corresponding electrode 222 may have the second corresponding opening UOP2. The second corresponding opening UOP2 may be positioned at the approximate center of the domain DM, and the first corresponding electrode 221 may be positioned overlapping the second corresponding opening UOP2. The edge of the first corresponding electrode 221 may overlap the second corresponding electrode 222. That is, the first corresponding electrode 221 may have a wider area than the second corresponding opening UOP2. According to an exemplary embodiment, the first corresponding electrode 221 may have the same area as the second corresponding opening UOP2, and the edge of the first corresponding electrode 221 may overlap the edge of the second corresponding opening UOP2. The second corresponding insulating layer 232 is positioned on the second corresponding electrode 222 and the first corresponding insulating layer 231. The third corresponding electrode 223 is positioned on the second corresponding insulating layer 232. The third corresponding electrode 223 may have the third corresponding opening UOP3. The region of the third corresponding opening UOP3 may be wider than the region of the second corresponding opening UOP2, and the region of the second corresponding opening UOP2 may be included in the region of the third corresponding opening UOP3 in the structure on a plane. That is, the second corresponding opening UOP2 may overlap the third corresponding opening UOP3. The first corresponding branch unit 221' connected to the first corresponding electrode 221 may be positioned at the same layer as the first corresponding electrode 221. The first corresponding branch unit 221' may be formed of the same material as the first corresponding electrode 221. The first corresponding branch unit 221' overlaps the second corresponding electrode 222 and the third corresponding electrode 223. The second contact hole H2 is positioned at the overlapping position of the first corresponding branch unit 221', the second corresponding electrode 222, and the third corresponding electrode 223. That is, at the overlapping position of the first corresponding branch unit 221', the second corresponding electrode 222, and the third corresponding electrode 223, the first corresponding insulating layer 231, the second corresponding electrode 222, and the second corresponding insulating layer 232 may have the second contact hole H2. The second contact hole H2 is filled with the conductive material, and the first corresponding electrode 221, the second corresponding electrode 222, and the third corresponding electrode 223 may be electrically connected to each other through the second contact hole H2. This structure may be formed by the same method as the structure in which the first electrode 121, the second electrode 122, and the third electrode 123 are connected to each other through the first contact hole H1 in FIG. 3.

Except for the differences, the characteristics of the exemplary embodiments described with reference to FIG. 31 to FIG. 36 may all be applied to the exemplary embodiment described with reference to FIG. 37 and FIG. 38 such that the description for the exemplary embodiment described in FIG. 31 to FIG. 36 is omitted.

The drawings referred to and the detailed description of the present inventive concept disclosed up to now are just exemplary of the present inventive concept, and they are used for describing the present inventive concept and are not used to limit a meaning or limit the scope of the present inventive concept disclosed in the claims.

Accordingly, those skilled in the art to which the invention pertains can easily understand that various modifications and equivalent embodiments may be possible. Therefore, a substantial technical protective range of the present inventive concept will be determined based on a technical idea of the appended claims.

What is claimed is:

1. A stereoscopic image display device comprising:
   a display panel including a plurality of pixels; and
   a lens panel positioned at a surface where the display panel displays an image,
   wherein the lens panel includes:
   a photomodulation unit controlling a light path of light emitted from the display panel; and
   a first electrode unit and a second electrode unit facing each other with the photomodulation unit interposed therebetween, and
   wherein the first electrode unit includes first electrode, a second electrode, and a first insulating layer between the first electrode and the second electrode,
   the first electrode and the second electrode are electrically connected to each other and are each positioned at different layers,
   the second electrode includes a first opening,
   the second electrode unit includes a first corresponding electrode including a first corresponding opening overlapping the first electrode and the first opening in a plan view,
   the first electrode without overlapping the first corresponding electrode in the plan view overlaps the first opening, the second electrode and the first corresponding opening in the plan view, and each of the first opening and the first corresponding opening is enclosed and has a shape of quadrangle.

2. The stereoscopic image display device of claim 1, wherein: the first insulating layer has a first contact hole at a part where the first electrode and the second electrode overlap; and the first electrode and the second electrode are electrically connected to each other through the first contact hole.

3. The stereoscopic image display device of claim 1, wherein:
the first electrode does not overlap an entirety of the second electrode and is connected to a branch unit overlapping the second electrode;
the first insulating layer has a first contact hole overlapping the branch unit; and
the first electrode and the second electrode are electrically connected to each other through the first contact hole.

4. The stereoscopic image display device of claim 1, wherein
the first electrode unit further includes:
a third electrode; and
a second insulating layer positioned between the second electrode and the third electrode.

5. The stereoscopic image display device of claim 4, wherein:
the third electrode has a second opening; and
the first opening overlaps the second opening.

6. The stereoscopic image display device of claim 5, wherein:
the first electrode does not overlap an entirety of the second electrode and is connected to a branch unit overlapping the second electrode;
the third electrode overlaps the second electrode;
the first insulating layer, the second electrode, and the second insulating layer have a first contact hole overlapping the branch unit at a part where the second electrode and the third electrode overlap each other; and
the first electrode, the second electrode, and the third electrode are electrically connected to each other through the first contact hole.

7. The stereoscopic image display device of claim 5, wherein:
the third electrode overlaps the first electrode and the second electrode;
the first insulating layer, the second electrode, and the second insulating layer have a first contact hole at a part where the first electrode, the second electrode, and the third electrode overlap each other; and
the first electrode, the second electrode, and the third electrode are electrically connected to each other through the first contact hole.

8. The stereoscopic image display device of claim 5, wherein the first opening and the second opening are positioned at different layers.

9. The stereoscopic image display device of claim 1, wherein
the second electrode unit further includes:
a second corresponding electrode; and
a first corresponding insulating layer positioned between the first corresponding electrode and the second corresponding electrode.

10. The stereoscopic image display device of claim 9, wherein:
the second corresponding electrode has a second corresponding opening; and
the first corresponding opening overlaps the second corresponding opening.

11. The stereoscopic image display device of claim 10, wherein:
the first corresponding insulating layer has a second contact hole at a part where the first corresponding electrode and the second corresponding electrode overlap; and
the first corresponding electrode and the second corresponding electrode are electrically connected to each other through the second contact hole.

12. The stereoscopic image display device of claim 10, wherein
the second electrode unit further includes:
a third corresponding electrode; and
a second corresponding insulating layer positioned between the second corresponding electrode and the third corresponding electrode.

13. The stereoscopic image display device of claim 12, wherein:
the third corresponding electrode has a third corresponding opening; and
the second corresponding opening overlaps the third corresponding opening.

14. The stereoscopic image display device of claim 13, wherein:
the first corresponding insulating layer, the second corresponding electrode, and the second corresponding insulating layer have a second contact hole at a part where the first corresponding electrode, the second corresponding electrode, and the third corresponding electrode overlap each other; and
the first corresponding electrode, the second corresponding electrode, and the third corresponding electrode are electrically connected to each other through the second contact hole.

15. A stereoscopic image display device comprising:
a display panel including a plurality of pixels; and
a lens panel positioned at a surface where the display panel displays an image,
wherein the lens panel includes:
a photomodulation unit controlling a light path of light emitted from the display panel; and
a first electrode unit and a second electrode unit facing each other with the photomodulation unit interposed therebetween,
the first electrode unit includes:
a first electrode having a plurality of first openings positioned on a same layer and respectively overlapping at least one pixel in a plan view;
a second electrode having a second opening overlapping at least two of the plurality of first openings in the plan view; and
a first insulating layer positioned between the first electrode and the second electrode and insulating the first electrode and the second electrode from each other, and
the second electrode unit includes a first corresponding electrode overlapping the second opening and the plurality of first openings in the plan view,
wherein each of the plurality of first openings is enclosed and the second opening is enclosed.

16. The stereoscopic image display device of claim 15, wherein,
in a first mode to display a 2D image, different voltages are applied to the first electrode and the first corresponding electrode.

17. The stereoscopic image display device of claim 16, wherein,
in a second mode to display a 3D image, different voltages are applied to the second electrode and the first corresponding electrode.

18. The stereoscopic image display device of claim 15, wherein
the first corresponding electrode entirely overlaps one surface of the second electrode unit.

19. The stereoscopic image display device of claim 15, wherein
the plurality of first openings are each a same size as each other.

\* \* \* \* \*